US011441540B1

(12) United States Patent
Shu

(10) Patent No.: US 11,441,540 B1
(45) Date of Patent: Sep. 13, 2022

(54) ALL-DEPTH OFFSHORE TURBINE POWER FARMS AND HYBRID VTOL JET ENGINES

(71) Applicant: Jianchao Shu, Cypress, TX (US)

(72) Inventor: Jianchao Shu, Cypress, TX (US)

(*) Notice: Subject to any disclaimer, the term of this patent is extended or adjusted under 35 U.S.C. 154(b) by 0 days.

(21) Appl. No.: 17/330,374

(22) Filed: May 25, 2021

(51) Int. Cl.
| | |
|---|---|
| *F03D 9/25* | (2016.01) |
| *F03D 3/06* | (2006.01) |
| *H02K 7/18* | (2006.01) |
| *H02K 7/08* | (2006.01) |
| *H02K 7/116* | (2006.01) |
| *H02K 9/19* | (2006.01) |
| *F03D 3/00* | (2006.01) |

(52) U.S. Cl.
CPC ............... *F03D 9/25* (2016.05); *F03D 3/061* (2013.01); *H02K 7/08* (2013.01); *H02K 7/116* (2013.01); *H02K 7/183* (2013.01); *H02K 7/1823* (2013.01); *H02K 9/19* (2013.01); *F03D 3/005* (2013.01)

(58) Field of Classification Search
CPC ............ F03D 9/25; F03D 3/061; F03D 3/005; H02K 7/08; H02K 7/116; H02K 7/1823; H02K 7/183; H02K 9/19
USPC ....................................................... 290/42, 53
See application file for complete search history.

(56) References Cited

U.S. PATENT DOCUMENTS

| | | | |
|---|---|---|---|
| 8,030,789 B2 | 10/2011 | Ortiz | |
| 9,476,401 B2 | 10/2016 | Han | |
| 10,024,302 B2 | 7/2018 | Zha et al. | |
| 2007/0120371 A1* | 5/2007 | Gehring | F03B 17/061 290/54 |
| 2009/0267347 A1* | 10/2009 | Abatemarco | F03B 13/10 290/43 |
| 2013/0140823 A1* | 6/2013 | Henry | F03B 3/04 290/53 |

* cited by examiner

*Primary Examiner* — Charles Reid, Jr.

(57) ABSTRACT

This invention relates to an ultimate renewable energy machine, all-depth offshore turbine system and hybrid VTOL jet engines, the turbine system is a volume-based power system ($Kw/M^3$) instead of the current area-based power system ($Kw/M^2$) and has a top wind turbine subsystem, a middle wave turbine subsystem and a bottom tidal turbine subsystem with the efficiency beyond Betz limit 59%, the turbine system includes a disrupt turbo-technology with robust shaft-less twin rotors and breakthrough dual-power zone blades to harness ocean energy in a synergic manner or individually, this system has all-season safety features for bird, marine life, human, and itself, is modularized and scalable for low LCOE<$0.10 kWh and provides reliable powers for 24/7, it represents a new era of renewable energy revolution leaded by this quintessentially American technology, as the ultimate fossil energy alternative.

8 Claims, 7 Drawing Sheets

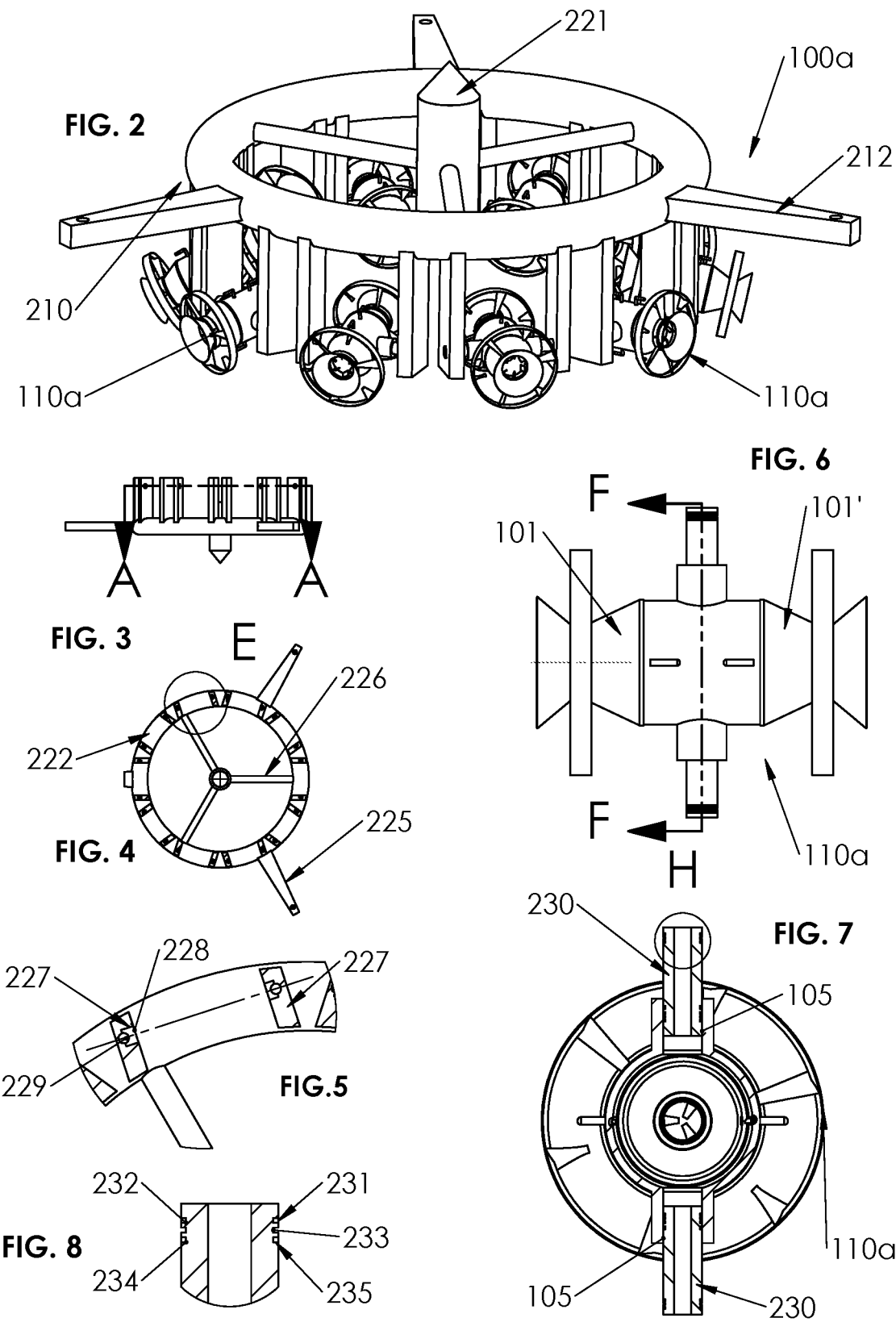

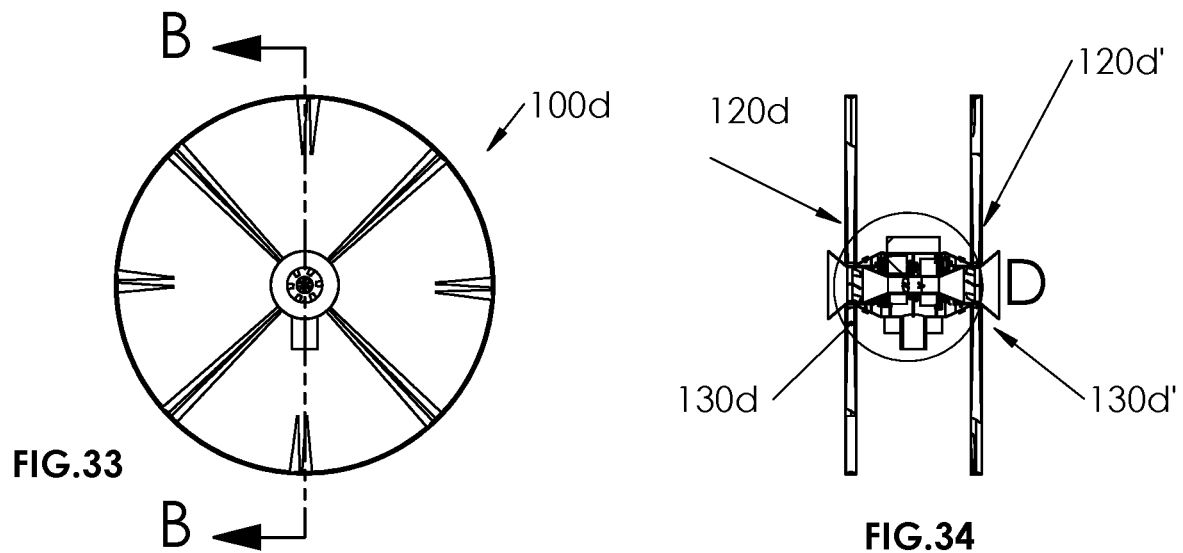
FIG.33
FIG.34
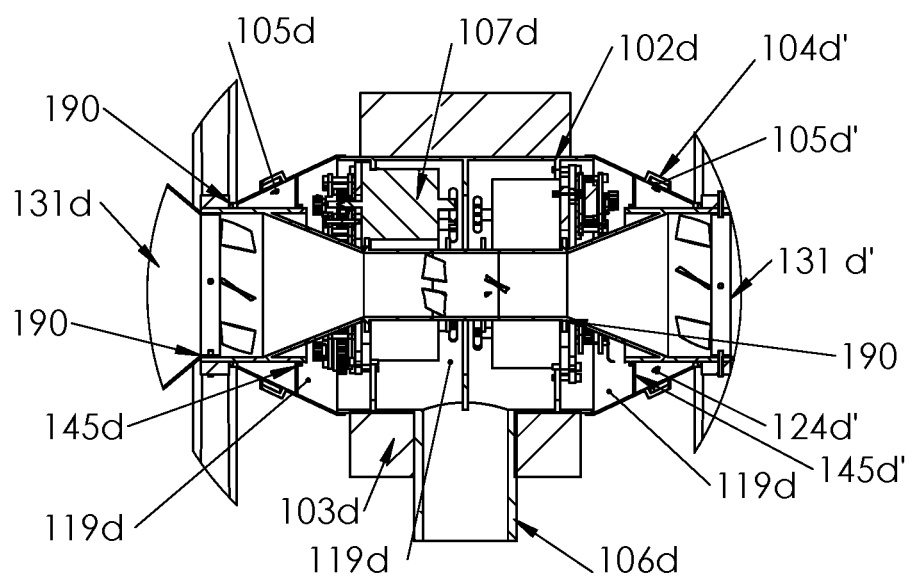
FIG.35
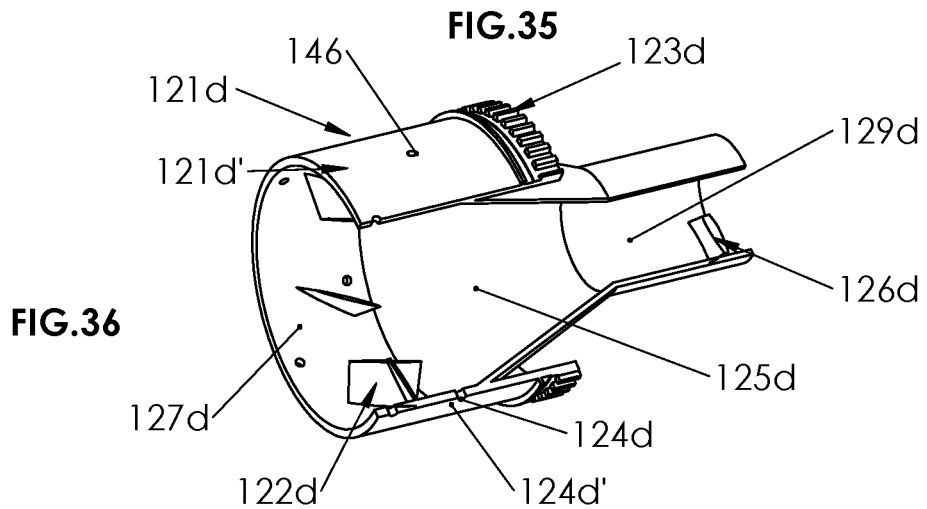
FIG.36

ALL-DEPTH OFFSHORE TURBINE POWER FARMS AND HYBRID VTOL JET ENGINES

CROSS-REFERENCE TO RELATED APPLICATION

This application claims the benefit of provisional patent application Ser. No. 62/982,690 filed on May 29, 2020 by the present inventor.

Federally sponsored research No

Sequence listing or program No

BACKGROUND

This invention relates to an ultimate renewable energy machine, all-depth offshore turbine system and hybrid VTOL jet engines, the turbine system is a volume-based power system (Kw/M$^3$) instead of the current area-based power system (Kw/M$^2$) and has a top wind turbine subsystem, a middle wave turbine subsystem and a bottom tidal turbine subsystem with the efficiency beyond Betz limit 59%, the turbine system includes a disrupt turbo-technology with robust shaft-less twin rotors and breakthrough dual-power zone blades to harness ocean energy in a synergic manner or individually, this system has all-season safety features for bird, marine life, human, and itself, is modularized and scalable for low LCOE<$0.10 kWh and provides reliable powers for 24/7, it represents a new era of renewable energy revolution leaded by this quintessentially American technology, as the ultimate fossil energy alternative.

The oceans on the earth have provided tremendous energy to humans; the forms of the energy include the wind energy, wave energy, the tidal energy, and the potential energy and the current energy. The earliest evidence of the use of the ocean tides for power conversion dates back to about 900 A.D., but it is likely that there were predecessors lost in the anonymity of prehistory. Early tidal power plants utilized naturally-occurring tidal basins by building a barrage (dam) across the opening of the basin and allowing the basin to fill on the rising tide. Humans have made the enormous efforts to harvest the ocean energy, from the world's first hydroelectric power scheme, which was developed at Cragside in Northumberland, England to the Hoover Dam in 1931. Most of the harvested energy is the wind energy and water potential energy, but to harvest hydrokinetic energy and ocean wind energy at a commercial scale is another story with very limited success, today most offshore wind turbines are fixed bottom wind turbine and very expensive in comparison with the land-based wind turbine, even there are some benefit of ocean strong wind, and only few floating offshore wind turbines become available in the market, but the technologies for floating offshore wind turbine are far more challenging than any other type of wind turbines, for example structural stability and high cost of the substructure and foundation, even there are some types of structures like spar, semisubmersible, tension leg platform, but they are not ready for the commercialization, as far the wave turbine is concerned, they are not even at a workable stage, finally most of tidal turbines are just a miniature of wind turbine without much innovation, so there are tremendous challenges and barriers for the conventional offshore turbine systems, in the today market of 2021, the followings are the problems and challenges;

(1) Low Efficiency. Since 1919, German physicist Albert Betz declared that the limit for the theoretical maximum efficiency for a wind turbine is 59% or a factor of 0.59. Today in 2021, more than 100 years later, we still cannot even reach the efficiency of 50%, even with all the powerful computation resources and sophisticated CFD models, and millions spent on building turbines. Most engineering books still tell us 0.40 as a practical efficiency of wind turbines, with the same limit being used for tidal turbines. If we continue to do the same thing over the next 100 year, Mr. Betz would come out of the grave and laugh at us. Maybe the limit is not right, but if we cannot even reach at least 50% efficiency, or figure out what is wrong, the rest of the effort would be futile.

According to Appendix A Fluid Flow Power Theory Applied to Wind and Tidal Stream Power Density Calculations at page 53, EPRI North American Tidal In Stream Power Feasibility Demonstration Project Phase: 1—Project Definition Study Report: EPRI—TP—001 NA Rev 2

1.1. Air Flow Because air has mass and it moves to form wind. Formula A

Power in the area swept by the wind turbine rotor: $P=0.5 \times \rho \times A \times V^3$ where: P= power in watts (746 watts =1 hp) (1,000 watts =1 kilowatt) $\rho$=air density (about 1.225 kg/m3 at sea level, less higher up) A=rotor swept area, exposed to the wind (m2) V=wind speed in meters/sec (20 mph=9 m/s) (mph/2.24=m/s)

1.2. Water (Tidal, River and/or Current) Flow. Formula B, water flow power density at 3 m/sec is $P=\frac{1}{2} \times \rho \times V^3 = \frac{1}{2} \times 1000 \times (3)3 = 13.5$ kW/m2. Assuming the same fTurbine+fDriveTrain+fGenerator+fPower Conditioning=0.36 then Delivered power density=13.5 kW/m2× 0.36=4.9 kW/m2 . Therefore, the power density of tidal flow energy at a tidal flow current speed of 2 m/sec is about 9 times greater than that for wind energy at a speed of 9 m/sec. (EPRI Guidelines for Preliminary Estimates of Power Production by TISEC Devices)

(2) Low density power turbine. AH existing turbines are an area-based power system with ever larger diameter blades occupying larger and larger footholds and spaces; for example, the wind blade size diameter change ranges from 10 M in 1979 to 162M in 2019 for 40 years, just think about the sizes what if we still used ever larger vacuum tubes which first used in ENIAC instead of ever smaller semiconductor chips on your PC or phone, then we declared ever larger vacuum tubes are a technology breakthrough, the world would laugh at us, why nobody laugh at the wind turbine manufacturers, there has been no fundamental innovation in wind turbine industries for last 100 year!!! Just look at the Formula A and Formula B. Even some wind turbine manufacturers declare that they make the biggest blade in the world as a breakthrough, on the contrary the more they produced the very lower density power turbines, the more they generate carbon instead of carbon reduction, the area-based turbines not only have low performance (Power/M$^2$), but also have high cost due to the lack of economics of scale, difficulty of production, assembly, repair, transportation and installation. As far as tidal or wave farms are concerned, those costs would be higher than that of wind turbines, finally they occupy large areas in the ocean and effect large numbers of marine life as well as birds, so it is impossible to deploy them in rivers or coastal areas or large lands, clearly the future of the area-based power systems looks very dark even at this early stage, so low density power turbine=low efficient turbine period, as we see in the near future the industrial revolution in 1800s would be surpassed by the renewable energy revolution in 2020s.

(3) All season safety issues. The turbines must be subject to all season conditions in order to deploy and provide energy, but many safety issues stay with us and include broken blades due to severe weathers, electrical fire related to internal failures and noise and disrupt or killing wild life in the air and water. Those issues cause public fear and even legal actions. Broken blades can hurt marine life or humans nearby and damage boats, the electrical fires are caused by overheats generators or short circuits, and this electrical fire can damage the turbines and can electrocute animals or humans, finally the noise is the biggest negative effect for marine life and animals in the long run. As we know from Navy sonar studies, it would hurt marine life and their reproductive abilities, and so far there are no solutions. According to the Natural Resources Defense Council, powerful underwater sounds produced by sonar can output sounds of more than 200 decibels, a level that spreads sound across the ocean and severely harms sound sensitive marine life like whales, finally every year, more than 200,000 migrated birds were killed and hurt in U.S. and forced many regulators to suspend many permits for wind turbine farms.

(4) Turbine design. Turbine designs have not changed too much over time, with most of the knowledge coming from the aerospace industries, there have been no breakthroughs or big leaps since the first patent for gas turbines were filed in 1791 by John Barber. We see the solid shaft in every turbine around the world, from steam turbines to wind turbines. The inherent flaw in this design is that the central passage is blocked and restricts the flow. The same shaft unfortunately has also blocked our imagination for the past 250 years, finally almost all existing wave turbines are not a wave turbine but a multiple wave energy converting machine, because there is no a turbine in the wave turbines!!

(5) Blades design. If turbomachinery is the soul of all turbines, then the blade is the heart of the turbines. If blades do not work properly, any effort on the rest of the components would be futile. The blades of tidal turbines are largely based on airplane blade design or propellers, while the wind turbine blades are inspired by bird wings, as far as the wave turbines are concerned, there is even no turbine to discuss, the large wind turbine blades are so inefficient with larger section in center root area to block flow and smaller in the tip area to generate less torque, the three-blade turbines are not a law but self-blind. Even with advanced simulations utilizing DEM method with advanced CFD, there have been no significant improvements, so what is wrong? The reason is that the efforts are based on the wing and lift or thrust theory, and not based on torque and rotation theory, here are facts that there are no birds or eagles with rotary wings in the nature, while there are no fishes or whales with rotary tails in the natural, and there are no horse or dogs with rotary legs, please remember that we, human create it, so only we, human improve it or nothing would happen in the next 100 year.

(6) Drive train design. The current turbine drive train is designed with a blade rotor, a gear box and a generator, this design arrangement has a foundational flaw especially for larger size blades. The blade rotor has the largest rotational inertial, the generator rotor has the second largest rotational inertial, and the gear box has the smallest output rotational inertial. When the rotor change the speed due to the wind speed change, the gear box output shaft cannot change immediately, because the generator rotor with the second largest rotational inertial is still rotating at the previous speed according to the Newton's first law, so this condition generates a dynamic speed difference or ratio between a low speed shaft and a high speed shaft in the gear box. Although the gear box has a static gear ratio by a design, the static ratio would not match the dynamic speed difference or ratio by design, as a result, the gear box become a rotary cushion between the blade rotor and the generator. This is why the gear box has the highest failure rate, and a flywheel function of the rotor would not power the generator, but rather damages the gearbox, the gear box accounts for 60% of the failures in wind turbines, second the current drive train has too much mechanic conversions, on average four to six conversion to reach a desirable speed. These conversions not only reduce the efficiency, but also weaken the structural integrity of turbines by adding more moving parts and increase cost and complexity, the repair costs of wind turbine gear box are the main issue for the users and greatly increase the levelized cost of energy (LCOE). Many customers just cancel the contracts due to high failure rates, and it would be more even more challenging and expensive for offshore wind turbines, this is an inherent issue for the modern turbine design. Finally the bearing is another issue for all turbines drive trains, besides the bearings in the gear box, the relative small bearing is subject to high loads from heavy rotor and large blades, even roller bearings cannot sustain the loads and suffer premature damages.

(7) Scalability design. If a product is not scalable, no matter how good it is, it would never enter the market at an affordable price. So far all existing tidal turbines or wave turbines have never entered the commercial market due to high cost, so there are many barriers. One of reasons is not scalable, in fact the lowest cost for a product is created by a product design and not by a product production process and the production process can reduce the cost but would not reach the lowest cost. At this point, just look at the blade, the scalability is not even considered possible even at the design stage by current manufacturers, as they are struggling to get a working product.

(8) Sustainability. It is a deal breaker, almost of 99% of turbine failures are due to sustainability issues, especially for the wave turbines; they either cannot sustain severer ocean or river conditions or need constant repair due to part damages or wearing, the reason is that the wave turbines have too many moving parts and cannot sustain violent waves. While tidal turbines are subjected to less violent waves, but they are subjected to high tidal impact in the seafloor or riverbed. Many tidal turbines' base structures are not suitable or robust enough for the seafloor or river flood terrain under tidal pulling forces, moreover the bearing is a key component in the motion mechanism of the turbines, so far they are designed as radical bearings, but used as axial as well radical bearings and too small to use for large blade rotations with overheat and premature wear issues, finally it is very challenged for the offshore wind turbines to sustain wind and wave in the ocean without tip-over, the fundamental problem for offshore wind turbine is the nature of horizontal wind turbine, which are designed to take most of wind power, as a result the winds generate great side load on three unbalanced blades bending force to tip over offshore wind turbine or cause it unstable, not mention if the hurricanes occur at the same time in the southeast coastal states during the hurricane season, or typhoon in Southeast Asia.

(9) Sealabilty. As the turbines are deployed in oceans or rivers, the turbines become pressure vessels. As the tidal turbines are deployed deeper, the external pressure becomes higher, sealability or leakage becomes a big issue for turbines, (especially tidal turbines) which can cause short circuits and damage to the turbines. The hot spots for leak are between the heavy rotor shafts and bearing bores (called 12 and 6 clock leaks), due to the dynamic seal under heavy weights, moreover if the blades are hit by foreign objects, the leakage could become ever worse.

(10) Accessibility. The accessibility is another deal breaker for most tidal turbines even with mature technologies from other land based turbines, because even today, most tidal turbines are not ready for prime time, they have lots of issues, the accessibility become a key issue even like mature subsea oil/gas industry in BP Deepwater Horizon oil spill, the cost of access to tidal turbines would become more expensive with a lift tower, the cost of tower is about 20 times or even higher than the cost of tidal turbines, or with divers the cost of access to tidal turbines would increase the repair and maintenance cost in the long run, so both would increase LCOE, moreover due to weather conditions, the time for access to the turbines is very limited and challenged.

(11) Synergy. There are no synergies among the current wind turbine system, wave turbine system and tidal turbine system in the today world market, the costs for the mooring assembly account for 60% of offshore floating wind turbine systems and wave turbine systems, while the costs for the lift tower account for 80% of total tidal turbine system, even there are common components like cables, inverters, control box, tower and mooring assembly, anchor systems for all turbine systems, so there is no a systematic approach to harness the ocean energy.

(12) Affordability. The cost for the turbines is obviously very high at this point, it also includes the production cost and maintenance and operation cost, most of turbine projects have government subsidies either in forms of tax or grant, even the cost has reduced for last 20 years, those high costs would unavoidably cause high LCOE. At this point, they are not affordable or profitable by any stretch of imagination, unless there are disrupt innovations in the field, the cost would not reduce to the affordable price.

So the industry has long sought means of improving the performance of those machines by improving the efficiency without much success, the listed problems are still with us.

In conclusion, insofar as I am aware, no such a system is formerly developed with new machines to solve the problems.

SUMMARY

This invention provides the high density offshore turbine power system with (1) a volume-based power system (Kw/M^3) instead of the current area base power system (Kw/M^2) and has a top layer of wind turbine subsystem and a middle layer of the wave turbine subsystem and a bottom layer of tidal turbine subsystem, each subsystem has a base assembly and multiple volume-base turbines, it increase the efficiency so much away beyond Betz limit 59% (2) shaftless and twin rotor assembly turbomachine, each tubing rotor assembly has a large open center passage with two set of blades and a bladed ring, so the two tubing rotor assemblies are designed to form a vortical mechanism to regulate an incoming flow into a vortical flow stream through the central passage and outside the central passage, according to Bernoulli's theory and conversation of mass, the vortical flow streams not only increase effective swept area that the blade diameter covers by sucking more flow, but also produces higher flow speed than natural speed of river stream or ocean streams, so the turbine system with 40% smaller diameter can produces 40% more power with much less materials and spaces in comparison with the current area-based power system (3) the novel bladed wheel is radially divided into a high energy zone around a tip ring and a low energy zone around with high mass and large radius and releases used flow in the low energy with less mass and smaller radius, as a result, it generates more than 30% of torques with less materials and higher strength than that the three blades can. A simple, robust, reliable and versatile hybrid shaft-less turbomachinery, which provide renewable energy solution with wind as well ocean wave energy to generate electrical power at much low cost, it is designed with the modulation, so vortical wind turbine as well as the wave turbine can be used together or separately, the vortical wind turbine is much compact about ⅔ or less in comparison with the conventional turbine but with the same amount of output, so they are deployable in various places for deferent demand with various modules, while the wave turbine can be installed with existing coastal wind farms or deplorable with various modules, the wave turbine system has a simple, robust structure for the buoyant housing, the housing holding electrical control unit has multiple hinge to hold the wave turbine with 360 degree rotary freedom as well as wire the wave turbines and to generate electricity as long as the seawater pass the wave turbines regardless direction, because the wave turbine moves with the wave with 360 degree which are perpendicular to the wave turbine through port, so the wave turbine system is relative stationary to the wave turbine pass port, so the wave turbine can produce electricity constantly, finally the heart of the system is the synergic system, so the mooring assembly becomes much simple with balancing side load among the wind turbine subsystem, the wave turbine subsystem and the tidal turbine subsystem, the arrangement completely disrupt all existing structures with a simple, robust structures, it has the tubing rotor assembly as a single moving part include internal blade sets and external blade sets and generate radial fluid movements as well as axial fluid movements, this unpresented mechanism create new solutions for the challenges the conventional turbomachinery faced, the turbomachinery greatly reduce the weights and increase fluid capacity and efficiency and reliability.

Accordingly, besides objects and advantages of the present invention described in the above patent, several objects and advantages of the present invention are:

(a) To eliminate shaft for the turbomachinery, such a machine has no an obstacle in flow passage and much less weight and increase efficiency and reliability.

(b) To provide a compact and efficient turbine, so it can provide sufficient electricity for a local community at much lower cost with less weight and land usage and smaller size or footholds.

(c) To provide a vortical wind turbine with most robust, efficient blade design, it has a larger effect diameter than the blade diameter, it is durable for specified number of usage with less maintenance, reliable feature and constructed with less material, turbulence with balanced structure, so the turbines are subject less side load and vibration.

(d) To provide an optimized flow characters of the turbine, such a turbine can produce max electricity with the lowest cost.

(e) To provide seal device with ability to sustain rotary speed under high wave or wind. So such a seal device not only reduce the energy waste but also prevent seawater or rain to corrode the internal parts of the turbine.

(f) To provide a universal bearing, such a bearing can support radial as well as axial loads and can be sealed and self-lubricated, so the bearing can stand for high side load under high wind or wave and be easily installed and replaced under a designed period.

(g) To provide a commercially available and workable wave and tidal energy systems, so the systems can provide sufficient electricity with a simple, low cost and robust structure, it can be retrofitted with existing ocean wind farm as well as an independent unit and can be deployed to coastal area or fixed vehicles or constructions in the sea or water.

(h) To provide a thermal efficient machine, so the machine can produce more energy at the highest efficiency with simple structures and materials, less or no cooling system.

(i) To provide a high density offshore turbine power system and turbine farms with a syndetic manner, so the system and farms can balance side loads and maximize output energy by optimizing energy flux among the subsystem and the systems of the farm, well as reduce cost and increase scalability and reliability.

Still further objects and advantages will become apparent from study of the following description and the accompanying drawings.

DRAWINGS

Drawing Figures

FIG. 2 is a ISO view of wave turbine subsystem of FIG. 1.

FIG. 3 is a front view of the wave turbine subsystem of FIG.2.

FIG. 4 is a cross sectional view of the float housing of FIG. 3 along line A-A.

FIG. 5 is a "E" detail views of a hinge joint of FIG.3a.

FIG. 6 is a front view of the wave turbine FIG.2.

FIG. 7 is a cross sectional view of wave turbine of FIG. 2 along line F-F.

FIG. 8 is a "H" detail views of hinge pin assembly of FIG. 7.

FIG. 33 is an ISO, cut view of an alternative wind turbine subsystem of FIG.28.

FIG. 34 is a cross sectional view of the subsystem of FIG. 33 along line B-B.

FIG. 35 is a "D" detail view of seal ring assembly of the assembly of FIG. 34.

FIG. 36 is an ISO, cut view of a tubing rotor assembly of FIG.35.

DESCRIPTIONS

Figure 1:
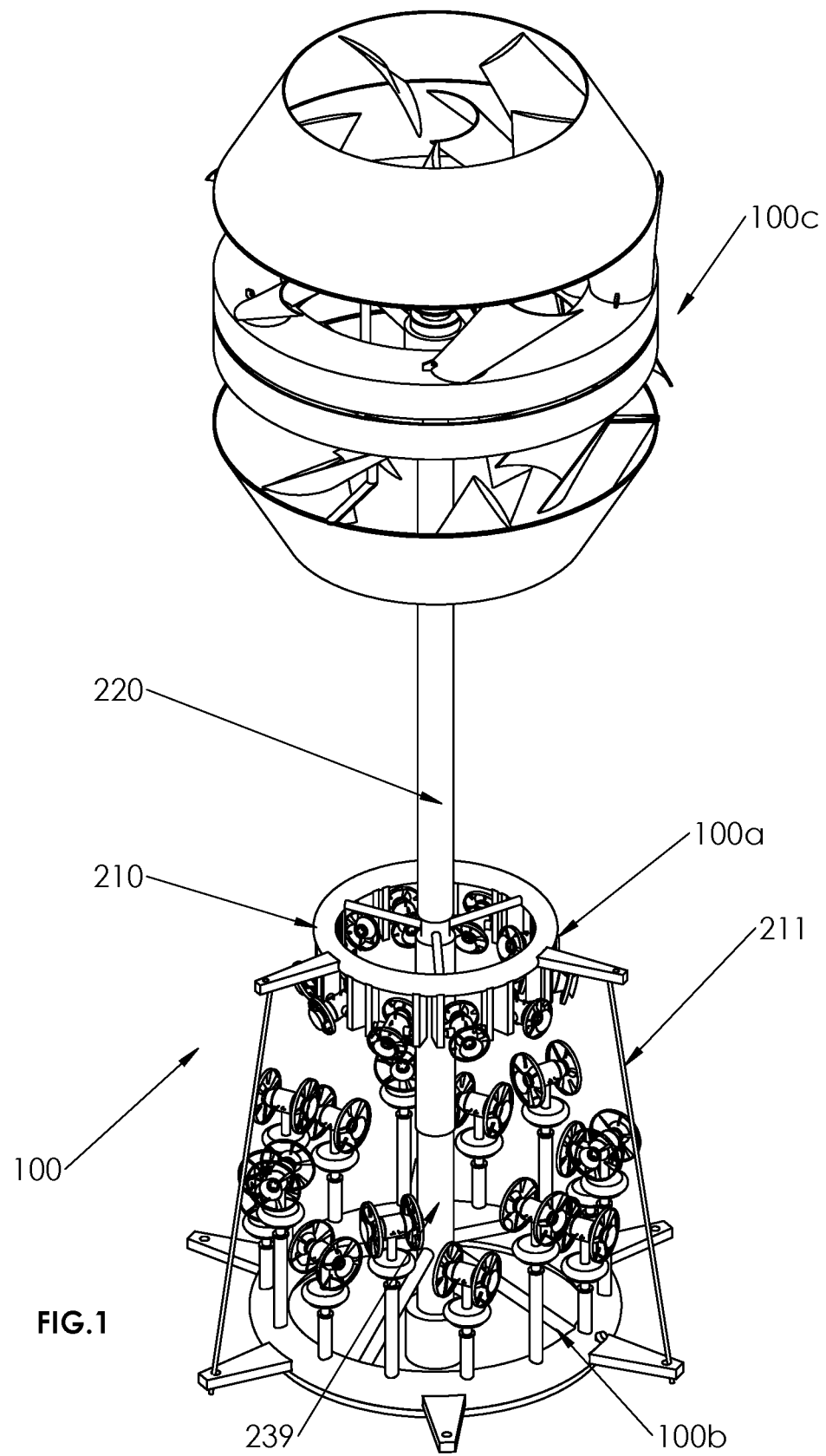
FIG. 1 is an ISO view of a high density offshore turbine power system with a top layer of a wind turbine subsystem, a middle layer, a wave turbine subsystem and a bottom layer a tidal turbine subsystem for harnessing wind and hydrokinetic energy constructed in accordance with this invention.
Figure 9:
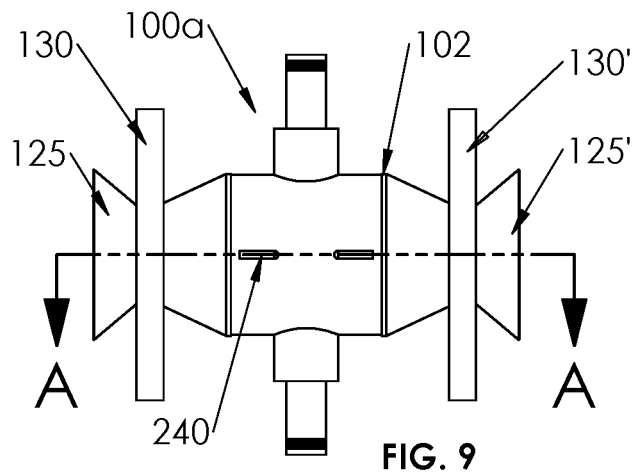
FIG. 9 is a front view of the wave turbine of FIG.2.
Figure 11:
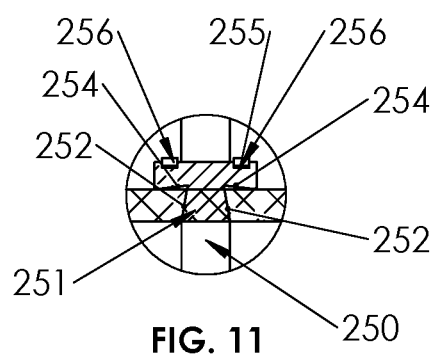
FIG. 11 is a "C" detail view of T seal assembly of FIG. 10.
Figure 10:
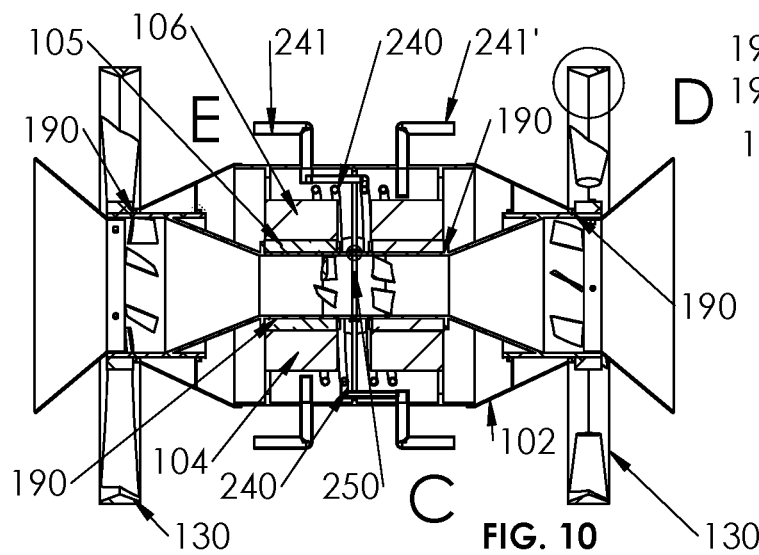
FIG. 10 is a cross sectional views of the wave turbine of FIG.9 along line A-A.
Figure 12:
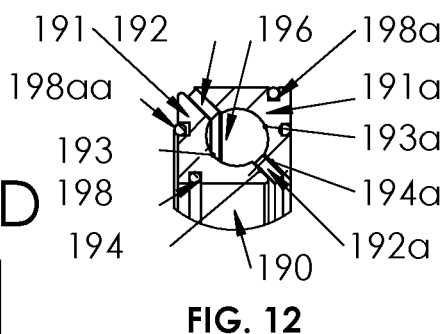
FIG. 12 is a "E" detail view of a bearing of the assembly of FIG. 10.
Figure 14:
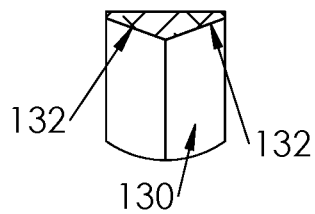
FIG. 14 is a "D" detail view of the turbine wheel of FIG. 10.
Figure 13:
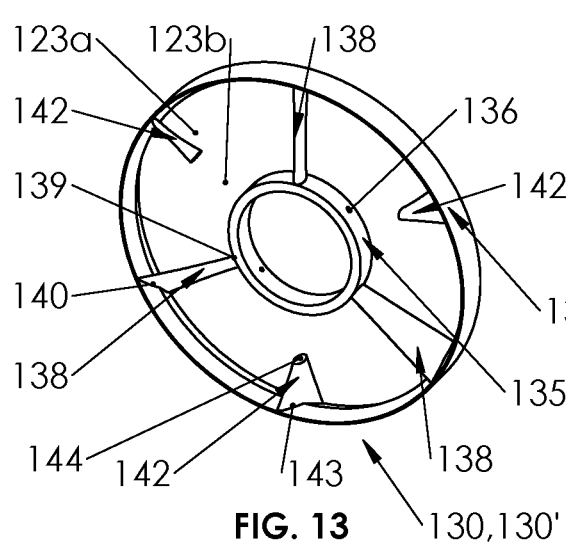
FIG. 13 is an ISO view of a tubing wheel of FIG.12.
Figure 15:
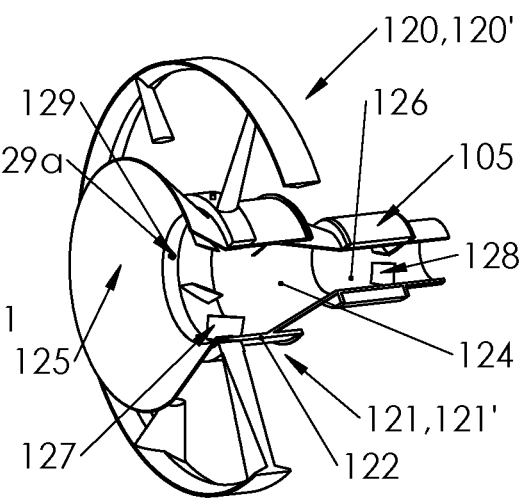
FIG. 15 is an ISO, cut view of a tubing rotor assembly of FIG.10.
Figure 16:
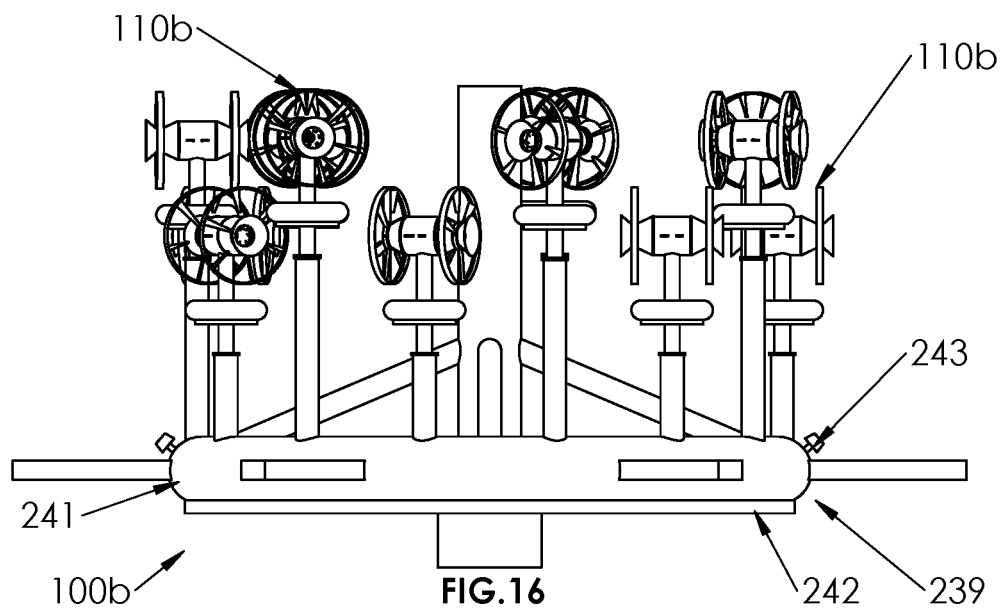
FIG. 16 is a front view of the tidal turbine subsystem of FIG.1.
Figures 17, 18:
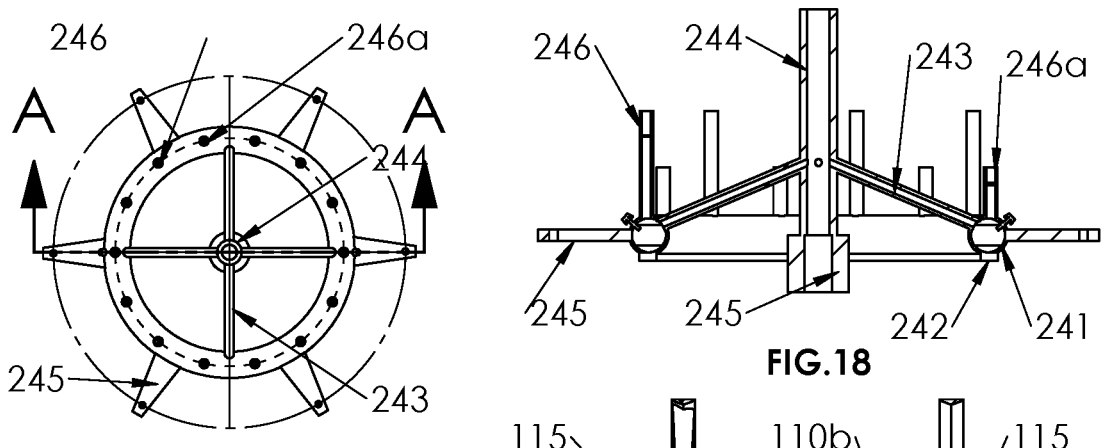
FIG. 17 is a top view of the tidal turbine housing of FIG.16.
FIG. 18 is a cross sectional view of the housing of FIG. 17 along line A-A.
Figure 19:
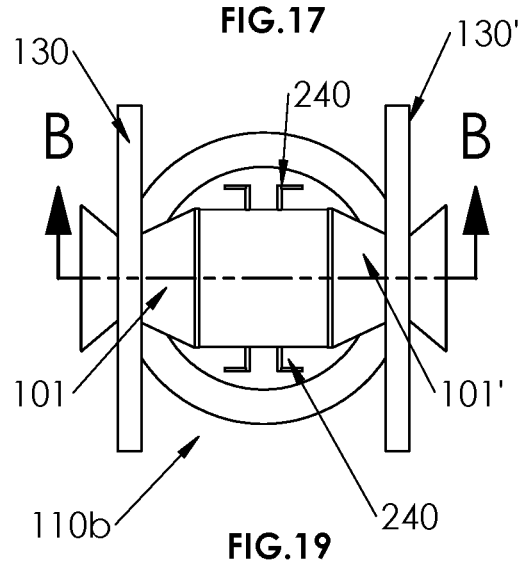
FIG. 19 is a top view of the tidal turbine assembly of FIG. 16.
Figure 20:
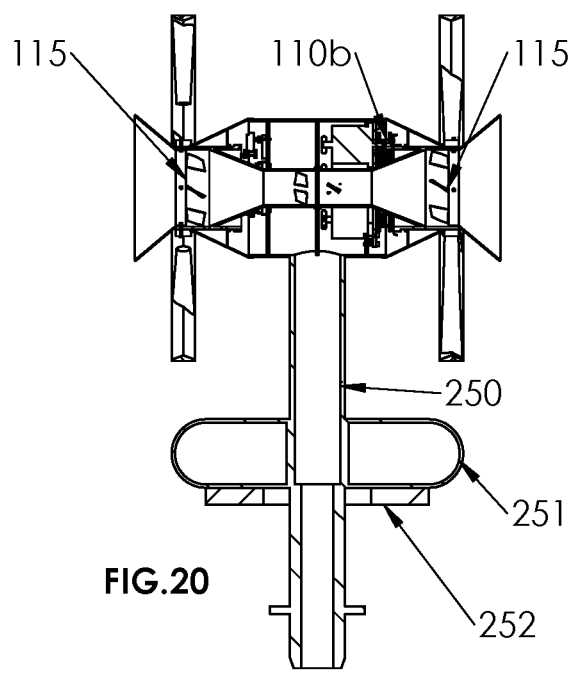
FIG. 20 is a cross sectional view of the assembly of FIG. 19 along line B-B.
Figure 21:
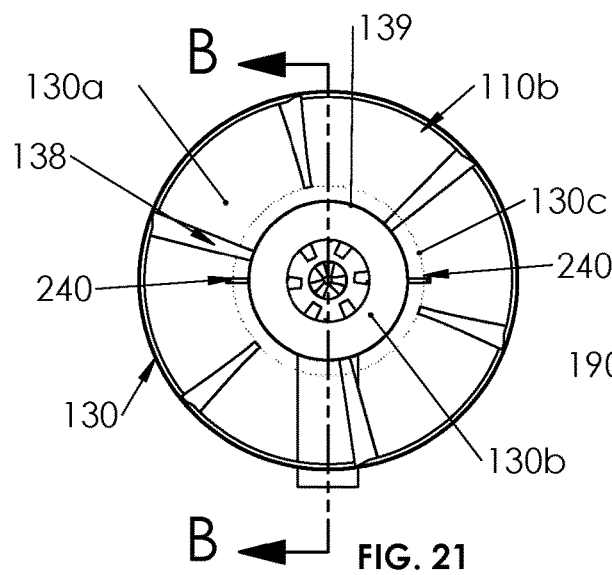
FIG. 21 is a side view of the tidal turbine assembly of FIG. 16.
Figure 22:
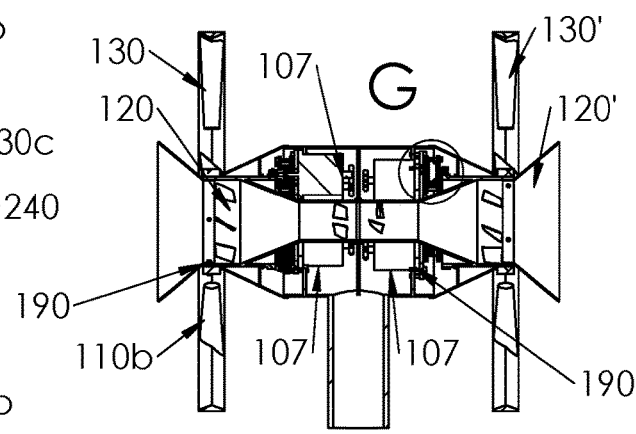
FIG. 22 is a cross sectional view of the assembly of FIG. 21 along line B-B.
Figure 23:
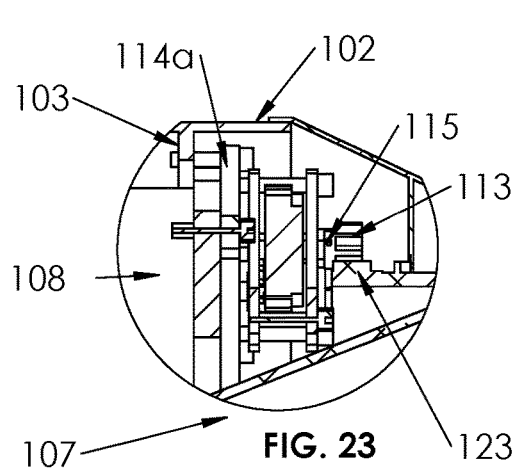
FIG. 23 is a "B" detail views of a gear train of FIG.22.
Figure 25:
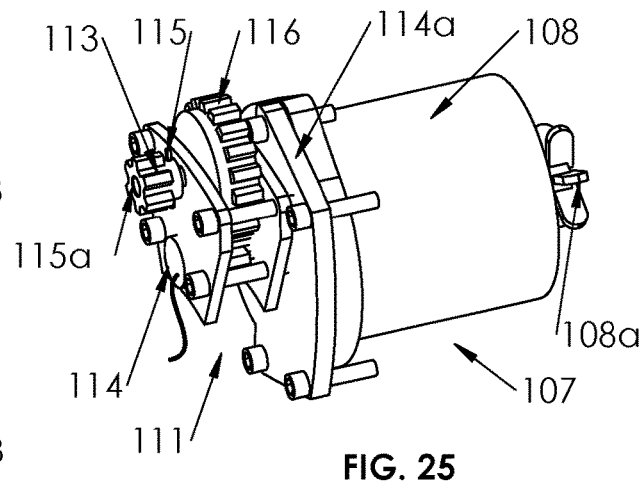
FIG. 25 is an ISO view of an satellite geared electrical generator of FIG. 22.
Figure 24:
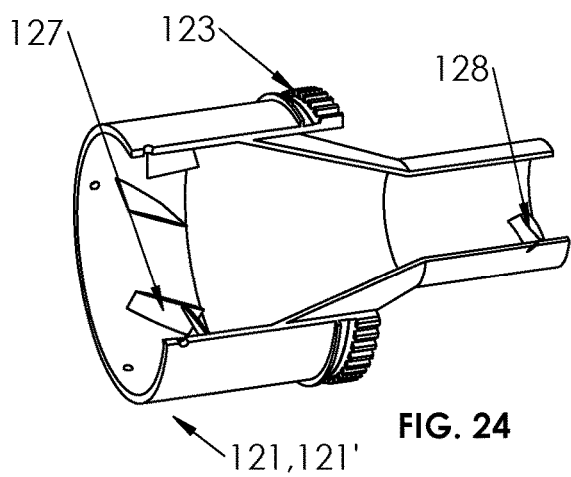
FIG. 24 is an ISO, cut view of a tubing rotor assembly of FIG.22.
Figure 26:
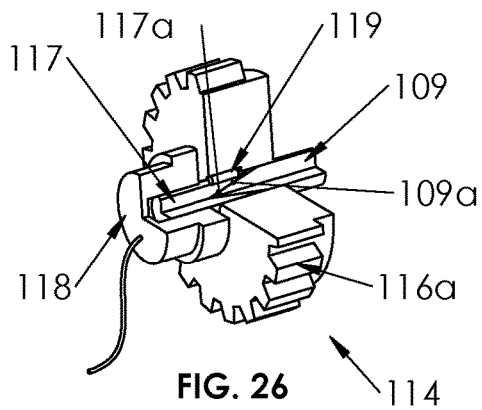
FIG. 26 is an ISO view of an solenoid gear set of FIG. 25.
Figure 27:
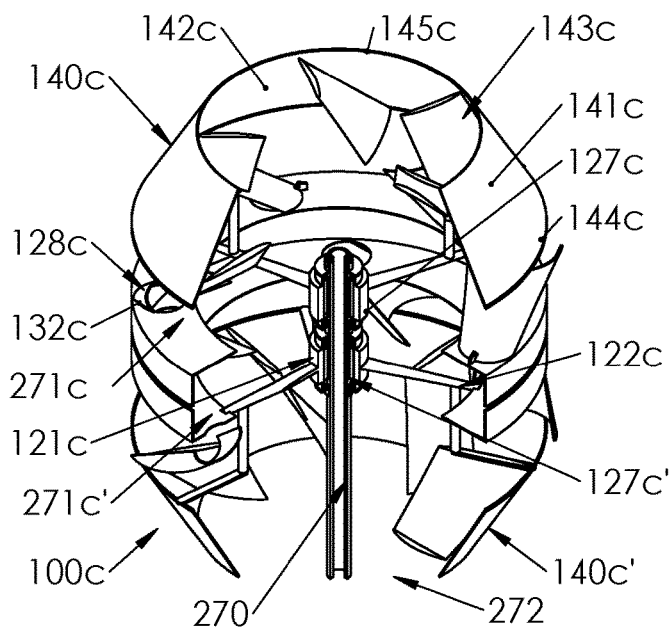
FIG. 27 is an ISO, cut view of the wind turbine subsystem of FIG.1.
Figure 28:
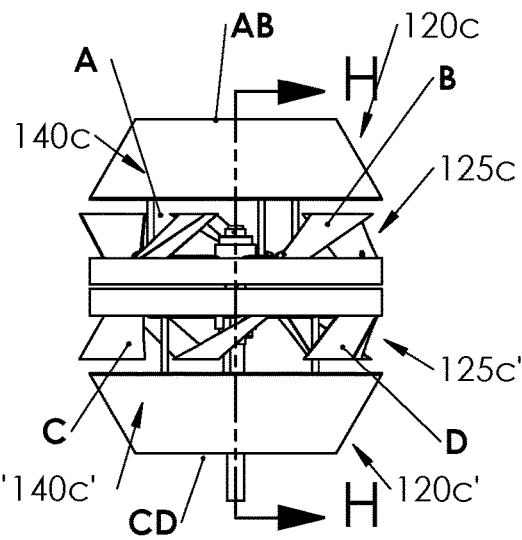
FIG. 28 is a front view of the wind turbine subsystem of FIG.1.
Figure 29:
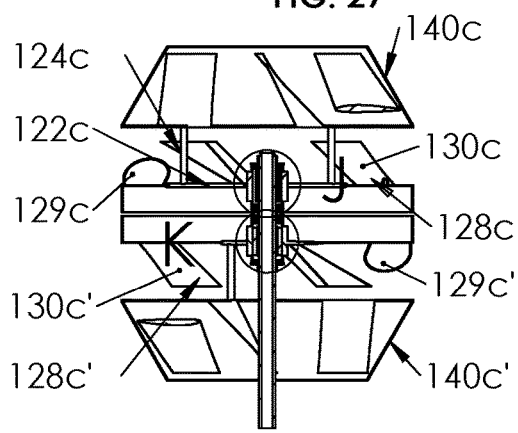
FIG. 29 is a cross sectional view of the subsystem of FIG. 28 along line H-H.
Figure 30:
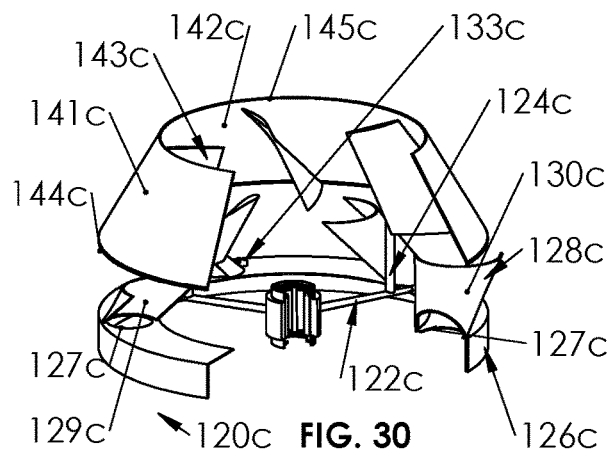
FIG. 30 is an ISO, cut view of a tubing rotor assembly of FIG.27.
Figure 31:
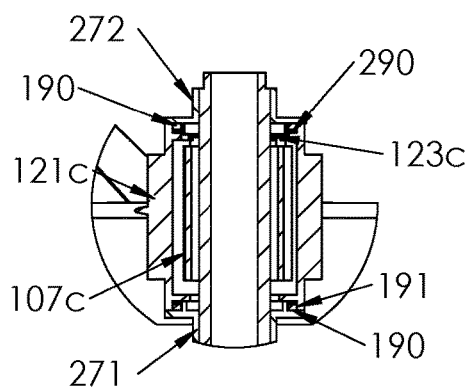
FIG. 31 is a "J" detail view of a bearing assembly of the subsystem of FIG. 29.
Figure 32:
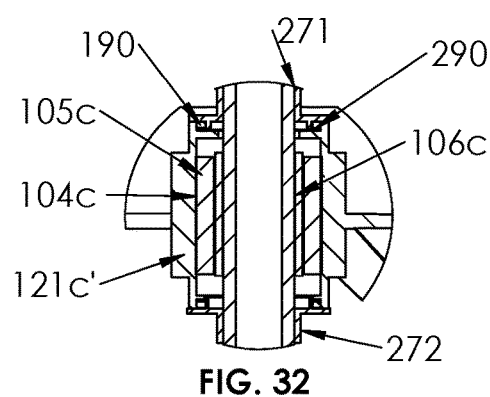
FIG. 32 is a "K" detail view of a bearing assembly of the subsystem of FIG. 29.

Referring FIGS. 1, a high density offshore turbine power system 100 includes a top wind turbine subsystem 100*c* having a wind tower assembly 220 for supporting the wind turbine subsystem 100*c*, a middle wave turbine subsystem 100*a* having a mooring assembly 210 for supporting the wave turbine subsystem 100*a* and the wind turbine subsystem 100*c*, and a bottom tidal turbine subsystem 100*b* having a lift tower assembly 239 for anchoring the high density offshore turbine power system 100 and connecting to the wave turbine subsystem 100*a* and other systems and land bases.

Referring FIGS. 1-15, the wave turbine subsystem 100*a* has the mooring assembly 210 and multiple wave turbines 110*a*, the mooring assembly 210 has a tower union assembly 221 with an electrical control box and a buoy ring assembly 222 and three link pipes 226 structured between the tower union assembly 221 and the buoy ring assembly 222, anchor lockers 212 and mooring lines/chains 211 extending to seabed through tidal turbine subsystem 100*b* for positioning the system 100, the buoy ring assembly 222 generates buoyance with contained gas and has multiple hinge holder 227 and multiple link pins 230 assembly to secure each wave turbine 110*a* under water, each hinge 227 has a joint pin hole 228 and a wire hole 229 extending to the tower union assembly 221 through the link pipes 226, each hinge 227 can be constructed with the buoy ring assembly 222 statically or rotatably, the buoy ring assembly 222 is constructed with many structures including toroid pipes and polygonal pipes are the strongest structures against the violent wave impact among all existing wave turbines and other structures like square, linear pipes or arrange of pipes are used for buoy ring assembly 222 in the near land area applications, and has three anchor rope joint ears 225, it not only provides the buoyancy, but also has more mobility to harness wave energy in all directions, technically almost all existing conventional wave turbines are not a turbine at all but multiple linear wave converters, the wave turbine 110*a* has two joint bores 105, the link pins 230 assembly is movably disposed between the joint pin hole 228 and the joint bore 105 for providing 360 degree rotation and seals, the link pins 230 assembly has a bearing groove 232 and a bearing 231 disposed in the bearing groove 232, a sealing device 233, and a sealant groove 234 and a seal ring 235 disposed in the seal groove 234, so this hinge joint is a vital feature for each wave turbine 110a to generate powers from the wave as long as the length of the wave turbines 110a is shorter than the length of wave, and a diameter of the turbine 100a is shorter than the wave height, the fundament difference between this wave turbines and any other wave turbines is that this wave turbine 110a can produce power constantly 24/7 regardless of direction of the wave unlike any other wave turbines, which literally convert the wave to linear up and down piston motions then to electrical rotations for generators in the world, let us debunk the water wave myth,. "Wave, a ridge or swell on the surface of a body of water, normally having a forward motion distinct from the oscillatory motion of the particles that successively compose it". Tests were conducted for this invention, a model of this turbine was installed in a long open tank, no matter how water pour into the tank, as long as the water passes the turbine, the electivity was generated by the turbine, as we can see the wave turbine can harness the kinetic energy form moving fluid or fluid stream regardless of type of the moving fluid, wave, vortex or straight water streams, it is fundamental difference from any other wave turbine and simple, robust and reliable.

Each of the wave turbines 110a has a body assembly 102 with a left body assembly 101 and a right body assembly 101', a left rotor assembly 120 movably disposed in the left body assembly 101 and a right rotor assembly 120' movably disposed in the right body assembly 101' and two generators 104 and two pair of bearing assemblies 190 respectively are movably between the body assembly 102 and rotor assemblies 120', a T seal ring assembly 250 disposed between two rotor assemblies 120, 120' for seals has T ring 251 defined by two axially conical surfaces 252, two radially conical surfaces 254 and two lock ring grooves 255, two lock rings 256 respectively disposed in the grooves 255 to generate preloading and to compensate wear, each of rotor assemblies 120, 120' has an end 126 having a mated surface engaged with the surface 252 of T seal ring assembly 250, so the T seal ring assembly 250 solve three challenging problems (1) misalignment of two rotor assemblies 120, 120' (2) wearing out, the soft T seal ring 251 can compensate the misalignment, while the lock rings 256 would compensate any wearing of soft T seal ring 251, (3) leakage, the conical surfaces 252, 254 provides a pressure-energized seal under either conditions; positive pressure differences or negative pressure differences, each of generators 104 has an electrical rotor 105 disposed on the rotor assemblies 120 ,102' and an electrical stator 106 disposed on the body assembly 101, 101' against the electrical rotor 105 for generating electrical power as the rotor assembly 120, 102' rotates, there are no other conversion mechanism or coupling needed, each year just coupling joints for land-based power generators and electrical motored machines waste great amount of energy due to misalignment of shafts, because of this simple turbine structure without a coupling, the wave turbine 100a has only two moving parts; the left rotor assembly 120 and right rotor assembly 120', it is impossible that any wave turbine can be simpler than that!, the wave turbine 100a is not only more efficient than any land based power generator and motored power machine in the world, but also is only one in the world can sustain violent waves with reasonable service life and cost!!!! The body assembly 102 has two natural water heat exchangers 240 with two end openings 241, 241' to circulate fluids between inside and outside of the body assembly 102 for cooling two generators 104, most turbines are equipped with internal cooling systems, which not only waste energy, but also become a main fire resource, each of rotor assemblies 120,120' has a front conical nozzle 125, 125', a bladed turbine wheel 130,130', a tubing assembly 121,121', the tubing assembly 121 has a tubing 122 with internal blades 127 expanding to a smaller tubing 126 with internal blades 128 through a conical tubing 124, the blades 127,128 divide an incoming fluid into a high power zone and a low power zone by inside diameters of the blades 127,128, according to Bernoulli equation, an incoming fluid speed would increase as the diameters of tap nozzle 125 and tubing assembly 121 becomes smaller, while the pressure decreases, as a result, a perfect center vortical fluid stream is created through the wave turbine 100a, unlike the conventional turbine, according to the formal B, the A=area, the nozzle 125 can suck more fluid than A=area the inlet diamante swept, for the first time, the A is no longer defined by a geometrical diameter of a turbine blade rather than by a dynamic diameter of a turbine blade, according to the formal B, $V/\sqrt{3}$, so the incoming fluid speed in the wave turbine 100a is no longer defined by an incoming fluid speed but an internal dynamic speed, as the nozzle diameter decreases, the internal speed of fluid stream increases and further rotates the tubing assembly 121 and power the tubing assembly 121 through blades 127, 128, then into the tubing assemblies 121' with opposite direction of blades 127' 128', so the incoming fluid would push the rotor assemblies 120' in an opposite rotation, according to Newtown third law, the rotor assemblies 120, 120' would reinforce each other the rotation even become faster with a pair of opposite rotary streams, as the incoming fluid passes the small tubing 126' to power the tubing rotor assembly 120' through blades 128',127' and gradually reduce the speed as the areas of tubing 124' increase, as tubing 122' become larger and larger, the pressure gradually increase to power the tubing rotor assembly 120' and enter into the nozzle 125' and flow out with less noise and turbulence, this center fluid stream and the twin rotor assembly 120,120' generate more power than all existing wave turbines and is a volume-based power machine, while other turbines all are an area-based power machine and have no a center stream hole or bore and vortex effects with a single rotor assembly and couplings, it is a game changer!!

Tests for this invention were conducted with a conventional rotor having range of 1 to 12 blades in a turbine, it is powered by electricity, there are two extreme cases, (1) as the rotor speeds up with the 12 blades, the blades soon become a wall, so there is almost no flow to pass (2) while the rotor speeds up with 0 to 1 blade, there is almost no flow to pass due to lack of converting power from the rotor, why did the rotor has the two results?because the conventional rotor is designed to add blade angularly so when the rotor speed up, eventually the rotor would block the flow path with certain number of blades, the same problems happen in the wind turbine blades as well as marine propeller blades, moreover if the rotor converted all 100% of a given power to the flow, then the rotor would stop, so the conventional rotor never reach high efficiency more than 50% to 55%.

The bladed turbine wheels 130, 130' are respectively disposed in a front of the tubing assemblies 121, 121', each of bladed turbine wheel 130 130' has an edge ring 131 defined by two surfaces 132 and a "V" shape or a surface 132 with a "C" shape, and a root ring 135, three long blades 138 between the edge ring 131 and the root ring 135, three short blades 142 with the edge ring 131, two radial zones; a high power zone 123a and a low power 123b defined by an inside diameter of three short blades 142, three long blades 138 are provided with supporting the wheel 130 and taking most fluid power in the high energy zone 123a with larger diameter and larger cross sectional areas and releasing the used fluid in the low power zone 123*b* with smaller diameter and smaller cross sectional areas, while three short blades 142 takes fluid power in the high power zone with larger diameter and larger areas more number of blades, and release most used fluid in the low power zone 123*b* with more open spaces, each blade 138 is defined by an airfoil cross section with a small root area 139 and a large tip area 140, each short blade 142 is defined by a airfoil cross section with a small root area 144 and a large tip area 143, so the high power zone 123*a* and low power zone 123*b* are divided radially to reach the optimized efficiency, so in the high power zone 123*a*, there are six blades 142,138 with large mass and larger radius of bladed turbine wheel 130 to generate more torques , so the rotor assembly 120 can generate more power, while in the low power zone 123*b*, there are only three blades with much smaller cross areas, even area of low power zone 123*a* may be equal to area of high power zone 123*b*, but the amount of power generation in each section is not equal, the angular division method for the current blade design has a very short period for the peak value and indiscriminately cut off area of high power fluid and low power fluid, while radial division method for the bladed ring 130 divides the incoming fluid into the high power zone 123*a* and low power zone 123*b*, the blades 142 and 138 generate maxim torques in the high power zoon 123*a* and release the used fluid in low power zone due to the conservation of mass and formal B, so the bladed turbine wheel 130 not only increases the strength of the blades 138, 142 as an integral structure to equalize loads between top blades and bottom blades during rotation and increase strength of blades by more 30%, but also reduces material, vibrations and tip eddies. Two bladed turbine wheels 130 arrangement greatly improves the performance by eliminating the tip eddy and greatly reducing the vibration of the rotor assembly 120, 120', wake turbulent as well as the noise, moreover, but also eliminate a yaw control with a pair of the turbine wheels 130,103', furthermore if loads pass a designed limit, each blade 138 has a root joint 139 which would be broken to protect rotor assembly 120 ,120' as a safety barrier, so no single sharp blade break out from rotor assembly 120 ,120', the tubing assemblies 121, bladed turbine wheel 130 have four joint holes 129 and four safety pins 129*a* respectively inserted into four joint holes 129 for securing the joints as a second safety barrier, if loads pass a designed limit, the safety pin 129*a* would be broken to protect rotor assembly 120, 120' and the body assembly 102.

According to Bernoulli equation, when the incoming fluid passes through bladed turbine wheel 130, the rotor assembly 120 would generate power through the external flow and generates power through a vortical flow due to the pressure gradient between a center flow in the tubing assembly 121 with the conical nozzle 125 and the edge ring 131 like high efficient high bypass turbofan jet engines, and the rotor assembly 120 rotates clockwise and the rotor assembly 120' anticlockwise due to opposite blades twist angles between bladed turbine wheels 130 and 130', so the vortical flow constantly sucks more fluid without blade tip leaks and blocking area in the center of the tubing assembly 121 than that the area turbine wheels 130 swept, this is a main reason why the rotor assembly 120 can pass the Betz limit and becomes so efficient that no other turbine can pass, the fluid outside the body assembly 102 generates three dynamics streams between the bladed turbine wheel 130,130', because the rotor assembly 120',120 have two set blades 138,142 with right and left opposite directions, those two dynamics streams become much rigid dynamic flow tunnels between the rotor assemblies 120, 120' according to Newton's third law and generate more power than single rotor can do, in addition, two pair of ball bearing assemblies 190 for both axial and radical loading are respectively disposed between the left side and right of the rotor assembly 120, 120' for stabilizing the rotation of the rotor assembly 120, 120' and supporting radial and thrust loading against the violent wave of the ocean, the ball bearing 190 has a left ring 191 and a right ring 191*a* and multiple balls 196, a left wedge insert ring 192 with multiple slots to hold the balls 196 separately and right wedge insert ring 192*a* with multiple slots to hold the balls 196, the left ring 191 has a conical surface 194 and a ball groove 193, seal rings 198, 198*aa*, the right ring 191*a* has a conical surface 194*a* and a ball groove 193*a* and seal rings 198*a*, 198*aa*, the multiple balls 196 are disposed between ball grooves 193, 193*a*, the left insert ring 195 and the right insert ring 195' are respectively disposed between conical surfaces 194,194*a*, the insert rings 192, 19*a* are made out of soft materials like bronze, aluminum, engineering plastics, sealant or grease are placed between left ring and right 191, 191*a*, as the tubing rotor assembly 120 rotates, insert ring 192, 192*a* are disposed between the rings 191, 191*a* to prevent sealant or grease from coming out, the ball bearing 190 has four seal rings 198*aa*, 198, 198*a* respectively disposed in the left ring 191, 191*a* for assembly seal, so far there is no single wave turbine in the world with the simple, robust mechanism with the robust all loading ball bears 190 and only one conversion between water wave and an electrical generator, moreover because of the shaft-less lager diameter rotor assembly 120 with more ball 196 in comparison with the conventional shaft turbine, so the more balls 196, the less stress on each ball 196!!

Referring FIGS. 16 to 26, the tidal turbine subsystem 100*b* includes a lift tower assembly 239 for connecting to the mooring assembly 220 by a firm piston joint and tension joints through mooring lines having rope/chain 221 for anchoring the turbine power system 100 and connecting to each other and land bases and multiple tidal turbine 110*b*, the lift tower assembly 239 has a buoy ring assembly 241 a lift air bag 242 to attached to the buoy ring assembly 241, and a lift tower 244 expanding to a base joint 245 and four link pipes 243 structured between the buoy ring assembly 241 and the lift tower 244, the buoy ring assembly 241 with two control valves 243 can be filled and drained with water and gas to balance with the weights of tidal turbine subsystem 100*b* against a depth of deployment, the tidal turbine subsystem 100*b* can be positioned at seabed or be float at any position for the all depth offshore turbine power system 100, so it covers both a floating and a fixed bottom types structures as the all depth structure, there is no one other structures like that, once the tidal turbine subsystem 100*b* reaches an end of usage life or need to be repaired, the lift air bag 242 would be triggered to lift the tidal turbine subsystem 100*b* to surface of the water without an external equipment or in emergency, the lift tower assembly 239 also has six claws 245 to fix with seabed or riverbed as well as with anchor lines at a float position and multiple turbine adaptor assembly 246, and 246*a* to receive respectively tidal turbines 110*b* with multiple turbine adaptors 250 at various levels, with 360 degree rotation freedom, unlike fixed tidal turbine, each tidal turbine 110*b* would be positioned at a best direction without a yaw control due to the twin rotor design, the base joint 245 is inserted a position hole in the seabed or riverbed with cables to a land-power station, each of turbine adaptor assemblies 250 has a buoy ring 251 and a repair airbag 252 to attach with the buoy ring 251, so any time, any turbine 110*b* need to be repaired, the airbag 252 can be trigged to lift up tidal turbines 110*b* to the surface of water, the tidal turbine 110*b* can generate output power constantly at a best position for 24/7, so there is no single adaptable tidal turbine like tidal turbine 110*b* in the world!!!

Each of the tidal turbines 110*b* has a body assembly 102 with a left body assembly 101 and a right body assembly 101', two generator racks 103 respectively attached with the left body assembly 101 and the right body assembly 101', multiple satellite generators 107 respectively attached with the generator racks 103 and a left rotor assembly 120 movably disposed in the left body assembly 101 and a right rotor assembly 120'movably disposed in the right body assembly 101' and two pair of bearing assemblies 190 respectively movably between the body assembly 102 and two rotor assemblies 120, 120', so the incoming fluid would power the rotor assemblies 120, 120' with clockwise and anticlockwise torques, each of the rotor assemblies 120, 120' has a tubing assembly 121, 121', the tubing assembly 121, 121' has internal blades 127, 128 to take flow energy from the incoming fluid and an external gear ring 123 to transfer respectively the rotary energy to the two satellite generators 107 for generating electricity.

Each of the satellite generators 107 installed with racks 103 has a gear train 111 and an alternator 108 having a magnetic shaft 109 with a conical tip 109*a*, and a fan 108*a*, the gear train 111 has an input gear 113 engaged with the gear 123 for transferring rotation from the rotor assembly 120 to the gear train 111, and a gear 116*a* engaged with a gear 116 with various ratio between 1:20 to 1:35 for transferring rotation from gear train 111 to the alternator 108, a safety pin 115 is placed between a shaft 115*a* and the gear 113 as a first safety barrier, so if load pass a designed limit in the gear train 111 between the generator 107 and the rotor assembly 120, the safety pin 115 would be broken first to protect generator 107 and the rotor assembly 120, the gear train 111 also has a solenoid coupler 114, the solenoid coupler 114 has a solenoid coil 118 and a plunger 117 with a conical bore 117*a* to receive the conical tip 109*a* of the magnetic shaft 109 and a slot between gear 116*a* and a plunger 117 to receive a dowel pin 119 to secure a radial engagement between gear 116*a* and the plunger 117 with an axial freedom, so when the coil 118 is deactivated, the plunger 117 is engaged with the magnetic shaft 109 by permanent magnetic forces and conical surface frictions, when the coil 118 is activated, the plunger 115 can be south pole or north pole against or with the magnetic shaft 109, so such arrangements along with multiple gear trains 110 with various ratio becomes a resultant gear box between the rotor assembly 120 and the alternators 108 with various ratios like a car transmission, so at low speed of fluid the plunger 117 repel the conical magnetic shaft 109, disengaged with conical magnetic shaft 109, so the rotor assembly 120 can build up speed, then as the water speed up, the high ratio generator 107 would kick in, then low ratio generator 107 kick in to match up the water speeds at the best performance, the complicated pitch control device is no longer needed, if speed is too high, more low ratio generator 107 would add in, the plunger 117 would double strength to lock down the rotor assembly 120, so when the first safety pin 115 would be broken to the rotor assembly 120 and gear trains 111, then the second safety barrier is the friction between the conical bore 117*a* engaged with the conical tip 109*a*, third safety barrier is joints 139 between blades 138 and the root ring 135, if the load on the bladed ring 130 pass a design limit, the joints 139 would be broken to protect the rotor assembly and the body assembly 102, finally if joints 139 fails to be broken, the four safety barrier is the safety pins 129*a*, if the load on the bladed turbine wheel 130 pass a design limit, safety pins 129*a* would be broken to protect the rotor assembly 120 and the body assembly 102, unlike the conventional blade, the bladed turbine wheel 130 has much less edge to damage other tidal turbines 110*b* or to hurt marine life, as far as the overheat is concerned, the alternators 107 are constantly cooled by the heat exchangers 240 along with a fan 108*a*, so without the pitch control and the yaw control, the turbines 110*b* become much cooler and simpler and more reliable.

Referring 27-32, a vertical wind turbine subsystem 100*c* has the wind tower 220 and at least one vertical turbine 272 attached with the wind tower 220, the vertical turbine 272 a has body assembly 270 having a top body assembly 271 and a bottom body assembly 271', a top rotor assembly 120*c* movably engaged with the top body assembly 271 and rotated clockwise and, and a bottom rotor assembly 120*c*' movably engaged with the bottom body assembly 271' and rotated anticlockwise, the body assembly 270 is attached with the wind tower 220, the top body assembly 271 has a first pair of position flanges 271, 272 sandwiching the top rotor assembly 120*c*, the bottom body assembly 271' has a second pair of position flanges 272, 271 sandwiching the bottom rotor assembly 120', two bearings 190 and two wave springs 290 are respectively disposed between the top body assembly 271 and the top rotor assembly 120, two bearings 190 and two wave springs 290 are respectively disposed between the bottom body assembly 271' and the bottom rotor assembly 120'.

The top rotor assemblies 120*c* has the housing assembly 12*c* having an axial rotor assembly 140*c* and a radial rotor assembly 125*c*, The bottom rotor assemblies 120*c*' has the housing assembly 121*c*' having an axial rotor assembly 140*c*' and a radial rotor assembly 125*c*', the top rotor assemblies 120*c* has three radial link beams 122*c* to support the radial rotor assembly 125*c* and respectively expanding three axial link bars 124*c* to support axial nozzle assembly 140*c*, the radial rotor assembly 125*c* has a skirt ring 126*c* having a bladed turbine wheel 119*c* having five bores 127*c* as a high power zone, five radial blade 128*c* respectively located around bores 127*c*, the radial blade 128*c* has an external curvature surface 130*c* with min drags and an internal curvature surface 129*c* with max load taking, a safety joint device between the radial blade 128*c* and bores 127*c* is defined by a hinge 133*c* and a safety methods including spot welding, gluing and safety spring or safety pins as a first safety barrier, once wind pass a designed limit, the joint between the radial blade 128*c* and bores 127*c* would be disengaged but connected with the hinge 133*c*, at this stage, each of the radial blades 128*c* is no longer to take wind energy because the internal curvature surface 129*c* is faced up, as a result the radial rotor assembly 125*c*,125*c*' would stop to rotate, while each of the axial rotor assemblies 140 would stop too with external blades and has an inlet 144*c* and outlet 145*c* defined by a conical shape, an internally conical surface 142*c* having five blades 143*c* to take wind energy from the radial rotor assembly 125*c*, the inlet 144*c* and the outlet 145*c* is divided d by an inside diameter of blade 143*c* to a high power zone and a low power zone, according to Bernoulli equation, wind speech would increase from the inlet 144*c* to the outlet 145*c*, a vortex fluid stream is created, so the axial rotor assemblies 140 would suck more wind energy than area the inlet 144*c* swept, the housing assembly 121*c* has a gear ring 123*c* and multiple geared generators 107 engaged with the gear ring 123*c* for converting kinetic rotation energy to electricity, while the housing assembly 121*c*' has a electrical generators 107*c*' having an electrical rotor installed with the bottom rotor assembly 120c' and an electrical stator 106c installed with the bottom body assembly 271 for converting kinetic rotation energy to electricity. The bottom rotor assemblies 120c' has the similar structure.

The vertical turbine subsystem 100c has a front inlet surface divided into a section A, a section B with the top rotor assemblies 120c, a section C, a section D with the bottom rotor assemblies 120c', the vertical turbine subsystem 100c also has a top outlet AB with the top rotor assemblies 120c and a bottom outlet CD with the bottom rotor assemblies 120c', so incoming wind streams flow in the section A and act on the surface 129c of the blade 128c to rotate the top rotor assembly 120c clockwise, and rectory flow of the incoming wind streams flow through bores 127c according to Newtown third law and hit the surface 129c' of the blade 128c' to rotate the bottom rotor assembly 120c' anticlockwise, then flow in the axial rotor assembly 140c' and hit internal blades 143c' and rotate the bottom rotor assembly 120c' anticlockwise again, then flow out from the bottom outlet CD, meanwhile the incoming wind streams flow into section D, act on the surface 129c' of the blade 128c' to rotate the bottom rotor assembly 120c' anticlockwise, and rectory flow of the incoming wind streams flow through bores 127c' and hit the surface 129c' of the blade 128c' to rotate the top rotor assembly 120c clockwise and then flow in the axial rotor assembly 140c and rotate the top rotor assembly 120c with blades 143c clockwise and flow out from the top outlet AB, the incoming wind streams flow in the section B and hit the surface 130c of the blade 128c without a sufficient rotation 127c according to Newtown third law, and flow up into the axial rotor assembly 140c and hit blades 143c and rotate the axial rotor assembly 140c clockwise and flow out from the outlet AB, finally the incoming wind streams flows in the section C and hit the surface 130c' of the blade 128c' without a sufficient rotation, and flow down into the axial rotor assembly 140c' and hit blades 143c' and rotate the axial rotor assembly 140c' anticlockwise and flow out from outlet CD, as a result, the full incoming wind streams in the sections A, B, C, and D rotate the top rotor turbine assembly 120c clockwise and rotate the bottom rotor assembly 120c' anticlockwise, so every section A, B, C, D play a positive role to power the vertical wind turbine subsystem unlike the conversional vertical wind turbine, one side torque of the wind turbine weaken other side torque, so according to Newtown third law and Formula A, the two twist streams; the downstream from section A to section C, the upstream from section D to section B interact and reinforce each other and increase air density and output power, moreover those two vortical streams suck more air than the diameter of the axial rotor assembly 140c or 140c'can cover, finally the rotor assembly 120 is based on a dual energy zone and is divided into two zone, a high power zone is covered by the radical rotor assembly 125c, 125c' with larger radius and more materials, while the axial rotor assembly 140c is divided in two power zones, a high power zone, and low energy zone, in the high energy zone, the axial turbine assembly 140 has blades 143c to generate higher power with larger radius and more materials, in the low power zone, the axial turbine assembly 140 has an open area to release wind streams, so the rotor assemblies 120c, 120c optimize the wind streams with maximum outputs, according to Bernoulli's equation, the wind streams would increase at blades 128ac through bores 127c and flow through the axial rotor assemblies 140c, 140c' and increase speeds again, the vertical wind turbine subsystem 100c produces more power than any vertical wind turbine with efficiency 59% or more, so on contrary to the conventional horizontal wind turbines, the vertical turbine subsystem 100c does not generate or populate any horizontal wave and vibrations, so by nature, it is the quietest over all existing wind turbines, moreover, each of rotor assemblies 120c, 120c' rotates at the same level, so it is much robust, finally there are no external blades, once wind strength passes a limit of the safe devices, the radical rotor assembly 128c or 128' stops, the axial rotor assembly 140c, or 140c' would stop too, finally the cross area of section A, B, C, D is rectangle, if a diameter×3.11416*2/2*height (H) (this vertical wind turbine)=a diameter/\2/4*3.1416 (conventional horizontal wind turbine), H=diameter/4, so with the same area the height of the vertical wind turbine is ¼ of the conventional horizontal wind turbine, and can generate more torques and power than conventional horizontal wind turbine, so the smaller height rotor assembly would not only reduce the tower height as well as side loading, but also lower center of gravity and increase stability, finally again the vertical turbine subsystem 100c is a volume based power machine with the top and bottom rotor assemblies 120c, 120c' with balanced outputs from the top out and the bottom outlet and each rotor assembly has double rotor assemblies with radical and axial rotor assemblies, so it produces the highest output power over all existing wind turbines, regardless of vertical or horizontal types.

Finally the vertical turbine 272 can be used along as a vector engine powered by electricity or one or two engines and by using the top rotor assemblies 120c and a modified top rotor assemblies 120c" by changing the bladed turbine wheel 119c with opposite blades upside down assembly 140c from the top skirt ring 126c, so even the top rotor assemblies 120c and a modified top rotor assemblies 120c'" rotate in an opposite direction , but the vertical turbine 272 has only one output stream either from AB top outlet or CD bottom outlet, first the vertical turbine 272 can be used as an electrical vector engine, by powering the top rotor assemblies 120c with an electrical machine, the bottom rotor assemblies 120c' with an electrical machine as a power producer instead of a power taker like the wind turbine, the vertical turbine 272 acts as an electrical vector engine and can suck fluid not only from the front entry but also from side round the turbine to generate thrusts, furthermore the vertical turbine 272 can be constructed as a hybrid vector engine with two toroidal burners in U.S. patent application No. 17/183,279 dated on Feb. 23, 2021, so the toroidal burners can power the vertical turbine 272 through the bladed turbine wheel 119c and the bladed turbine wheel 119c' by the combustion gas through the two toroidal burners, so the electrical machines in the vertical turbine 272 act as compressors with blades, the toroidal burners combust with fuels and the compressed air to power the vertical turbine 272, while once an aircraft with the engine reach at a desirable speed, the electrical machine can be used as a generator to charge the battery, the unique rotary rotors would secure accurate moving orbit, the key difference from conventional for vertical landing and takeoff engines is the axial blade rotor assembly with internal blades, it is safer and more robust and protects the engine from sand storm and ballets and efficient with twin rotor and blade turbine wheels, so it can be used as propellers installed at an end of missiles or torpedo, a hypersonic missile final correct engine, so as a hybrid vector jet turbo engine, the applications would cover from the drone applications, personal flyer or personal to vertical landing and takeoff for helicopters main rotor and tail rotor like Sikorsky UH-60 Black Hawk.

Referring FIGS. 32-36, a horizontal wind turbine subsystem 100d includes at least one horizontal wind turbine 103d attached to the wind tower 220, at least one horizontal wind turbine 103d has a body assembly 102d having a left body assembly 101d and a right body assembly 101d' and a left rotor assembly 120d respectively movably disposed in the left body assembly 101d, a right rotor assembly 120d' respectively movably disposed in the right body assembly 101d' and two pair of ball bearing assemblies 190 respectively disposed between the left body assembly 101d and the left rotor assembly 120d, between the right body assembly 101d' and right rotor assembly 120d', the at least one horizontal wind turbine 103d has a tower top adapter 106d and fins 103d, covers 104d and multiple ventilation hole 105d under the covers 104d, multiple geared satellite power generators 107d, each of the rotor assemblies 120d, 120d' has a bladed turbine wheel 130d, a gear ring 123d engaged with satellite power generators 107d and, a tubing assembly 121d having a nozzle 131d with a protective screen, an external bladed turbine wheel 145d powered by bypass air streams from the ventilation holes 105d as well as to cool satellite power generators 107d and flow out some into holes 146, the tubing assembly 121d has a tubing 127d with blade 122d connected to a smaller tubing 129d with blades 126d through a conical tubing 125d, so main incoming air streams pass through the left tubing assembly 121d, and increase speed and rotate the left rotor assembly 120d, by now at the middle section, the main in coming air streams as well as the bypass air in chamber 119d' are coming together become hotter, so even the incoming air streams pressure loses, some energy through the tubing rotor assembly 120d but gain the pressure energy according to thermodynamics, then pass through the right tubing assembly 121d' and rotates the right rotor assembly 120d' in opposite rotations, as the bypass air streams power an internal bladed turbine wheel 145d' as well as cool satellite power generators 107d' and release through ventilation holes 105d' and holes 146, while the main incoming air streams passes the small tubing 129d' to power the tubing rotor assembly 120d' through blades 126d' and gradually reduce the speed as the areas of tubing 125d', the tubing 127d' becomes larger and larger, the pressure gradually increase to power the tubing rotor assembly 120d' further through blades 122d'.

In addition, the horizontal wind turbine 100d can be used as a high power hybrid VLTO engine with the left rotor assemblies 120d and the right rotor assemblies 120d' and produce thrusts as an opposite function of the wind turbine to output power instead of taking power from outside source like wind, first the horizontal wind turbine 100d has the satellite power generators 107d to power the left rotor assemblies 120d and the satellite power generators 107d' to power the right rotor assemblies 120d in an opposite direction, up or down as an electrical vector turbine, second the horizontal wind turbine 100d can be constructed as a hybrid vector engine with the two toroidal burners in U.S. patent application No. 17/183,279 dated on Feb. 23, 2021, the horizontal wind turbine 100d has the satellite power generators 107d to power the left rotor assemblies 120d as a left compressor, then one of the toroidal burners generates hot gas to power the internal bladed turbine wheel 145d through the left ventilation holes 105d, the same as the right side the horizontal wind turbine 100d. So in comparison with the vertical turbine 272 with internal bladed turbine wheel, the horizontal wind turbine 100d has the external bladed turbine wheel with much more output thrust, it can be used for high power vertical landing and takeoff (VTOL) like V-22 Osprey as well as main rotor as well as tail rotor for helicopters, unlike the conventional helicopter rotor system, the horizontal wind turbine 100d has redundant power system and redundant twin rotors and is much quieter due to twin rotor assembly, for the commercial applications it can be used for as a personal fly car and drones, people can fly like a bird or drive like a fish, it is safe and compact but powerful for venture or military uses.

Although the description above contains many specifications, these should not be construed as limiting the scope of the invention but as merely providing illustration of some of the presently preferred embodiments of this invention.

Thus, the scope of the invention should be determined by the appended claims and their legal equivalents, rather than by the examples given.

CONCLUSION (A) Harness Most of the Fluid Energy with the Highest Efficiency

Conventional turbine Efficiency (a) Cp, the efficiency for a wind turbine or other turbines, according to the Betz limit is 59% or 0.59 factor. The conventional turbine has a single blade rotor inherently with a large central shaft, it blocks the larger central area A1, so the formula should be $P=\frac{1}{2}p(A-A1)CpV^{\wedge}3$, by now you know why the conventional turbine never reach even 50%. (b) The swept area would not increase without physical change. (c) Wind speed or the stream speed of river or ocean is given by Mother Nature and cannot be increased by the turbines.

Let us look at $P=0.5\times\rho\times A\times V^{\wedge}3$, this system bring a disrupt innovation with the volume-based power machine, which increase air "ρ" by generating a pair of twist air streams according Newtown third law, increases "A" by removing center shaft area and generating vortex stream, adding twin rotor assembly (2*A) and a center internal stream and external stream defined by a high power zone and low power zone, increase "V" by using conical passage according to Bernoulli's equation, the center stream speed increases, while the center stream pressure decreases, the vortex stream can suck more fluid than blade diameter swept.

(B) Breakthrough Blade Design (1) Conventional blades are based on airplane and windmill or propeller designs has three section the root, the mid span and the tip (1.1) at the root, there is a large area, where the blade produces no torque but block flow passage. (1.2) at the tip, the area is the smallest, as a result this area x largest radius$^{\wedge}3$, generates the smallest torque. (1.3) at the mid span, it produces the most.

(1') Bladed ring is based on the dual power zone technology with airfoil cross-sections. (1.1) At the root, there are no blades to cover (1.2) At the mid span, it has the smallest area closest to the root and the strongest strength supporting bending and torsion. (1.3) At the tip, it has the larger twist area X largest radius$^{\wedge}3$ and more number of blades, so together it generates the largest torque over all existing blades, moreover the bladed ring not only eliminates the tip eddy flow and flow leak but also increase the efficiency.

(2) Maximize the blade strength with less material and optimized shade (2.1) Conventional blades are individually designed, so each blade cannot share loading with each other, therefore each blade must be designed with maximum strength, so there is no synergy, because each blade is subject to the different stream speed/pressure gradient due to the increased blade diameter during rotation, about 60% of blade failure happened on a single blade (2.2) most blades are provided with unsymmetrical airfoil sections and twist angle between the tip and root, those structures inherently become very weak at the root section, so the root section must be designed with a big section, and a tip section must be designed so small, as a result, those structures defeat the purpose of airfoil. It is said that the blade is based on an oval wing or humming bird wing, if so the design is foundationally wrong, because bird wings are used to fly with lift forces while turbine blades are used to rotate and generate torque, many turbine designs are wrongly based on wind theory and lift, a bad aerodynamic design. (2.3) as the blades get so bigger, the problems get worse, hollow blade becomes the only choice. There is also the subject of thermal stress failure due to the thermal gradient between external and internal temperature, which would not happened for the solid blades. (2.1') Bladed turbine wheel is a grouped design with all blades, edge ring and root ring, so all blades share load even all-time through the edge ring even under the different stream speed/pressure gradient due to the increased blade diameter, single blade broken is highly unlikely (2.2') Bladed turbine wheel are provided with symmetrical airfoil sections and twist angle between the tip and root, those structures become very strong at the root section, so the root section must be designed with a small section, and a tip section must be designed so large, as a result, those structures defeat the purpose of airfoil (2.3') Solid blades can sustain weather change as well as thermal change, strong wind and storm.

(C) Breakthrough Blade Design

Twin rotor design is a volume-base power generation and based on a shaft-less turbomachinery and the vortical mechanism with the central passage and a large bladed fan stream like a high bypass turbofan jet engine (a) Area=2*A with two rotors , breaking the Betz limit (a2) full area with a center open area (a3) the vortical mechanism not only increase the effective swept area about 10% more (b) but also increase flow stream speed and reduce the central flow pressure, so the incoming flow P1 at inlet would decreases, while P1' at the tip ring has no change, so the pressure radiant causes the inlet nozzle to sucks more flow than that the swept area covers, and speed up rotors with two blades, two rotors are concentric and rotated clockwise and counterclockwise and generate some vibrations, but the two vibrations would cancel out each other (c) Two bladed turbine wheels eliminates the tip eddy, canceling out two wake rotations, those improvements greatly reduce the noise, as a result, the protective area of river or ocean can be reduced as well as the cost, risk of hurting ocean life or river life can be reduced as well. (d) The two bladed turbine wheels generate three dynamics streams like three dynamic wind tunnels. Due to Newton's third law, they become rigid and eliminate the yaw control system.

(D) Vertical Wind Turbine.

The vertical wind turbine is a revolutionary turbomachine, first for the first time a vertical wind turbine can take wind power with a full facing area to generate electricity, so far there has been no single vertical wind turbine that could do for 100 years, when Georges Darrieus invented the first vertical wind turbine in France during the 1920s, the twin rotors with breakthrough blades complement each other, so other half area on each rotor can be powered by other turbine, second the safety device for the radial rotor assembly provide a vital solution for the suitability and stability even under typhoon or hurricane and is complete different from the conventional measure with the electrical shutoff, it is not only simple and robust, but also has cost-efficient and reliable and bring a new era of the offshore wind turbine for all weather applications, third deportability is other feature in terms of the size and height and substructure of this vertical wind turbine, this disrupt innovation would fundamental change the history of the offshore wind turbine.

(E) High Power Hybrid Vector Jet Engines for (VTOL)

The vertical wind turbine and horizontal wind turbine can be constructed as hybrid vector turbojet engines, it includes breakthroughs like a hybrid function with electricity and gas turbine, the shaft-less twin rotor assembly, double power zones and blade turbine wheel, the combination of the electrical motor control and gas turbine control provides excellent performances with maneuverability and reliability, those hybrid various speeds are provided with precisely landing and takeoff control, more importantly any aircraft with this engine would have a revolutionary change to take full advantage, just image what the future car look like then you know the potentials this engine can bring to you, those features are excellent choice for update grade with existing VTOL products, which have common issues (1) noise (2) less redundancy (3) lower power (4) less maneuverability (5) high operation cost, first two or three those engines can power an aircraft or helicopters, each of the engines has two electrical motors and two gas turbines without gear box and shaft couplings, so this engine provides the most reliable structures with four redundancy over all related jet engines, second the hybrid vector turbojet engines provide more mobility and operability which surpass other similar products in the history, the much smaller, two balanced blades turbine wheels provides much faster vector change during flight like fighter jet, but the conventional unbalanced VTOL products with the large blades become difficult for vector change, if it changes too fast, the aircraft can lose stability, so this smaller blades wheeled but powerful engine provides a perfect solution for maneuverability, and the mobility and reliability are also vital for the landing and takeoff, the precision time and position control are important for the aircraft with regular VTOL jet engines, but the control is very challenging, for the electrical motor powered engine, the control become much easy and simple like electrical car control even like AI autonomous car without pilot interference, for fast takeoff in military operations, the electrical motor powered engine can accelerate much faster any gas powered engine, during the flight, or heavy lift , the gas powered engine play a key role for speed and heavy lift, furthermore during flight, the electrical motor because a generator to charge the battery, it only reduce carbon emission, but reduce operation cost, finally during landing and takeoff, we are used to the noise, but for this engine, with electrical motor powered and twin rotors, the louder noise because history, why quiet engine is so important? first for military operations, the quiet landing and takeoff is vital for the successful attach or rescue operation, second for military bases, the noise pollution become politic issues, we see U.S. bases around the world, with this quiet engine, the noise become the past, so the protesters near the military bases would disappear, finally for the deportability, the blades turbine wheel can be dissemble and assembled easily and fast.

(F) Drive Train Design

The conventional wave turbine drive trains have 5 conversions (1) electrical rotor to electrical stator in a power generator (2) the electrical rotor shaft to the electrical rotor (3) a gear box output shaft to the electrical rotor shaft (4) a rotatory shaft to the gear box input shaft (5) a linear shaft to the rotatory shaft.

The twin rotor wave turbine 110a has only one conversion; an electrical/turbine rotor to an electrical stator in a power generator, so the shorter the drive train is, the more efficient and the more robust the drive train would become. This is the reason that twin rotor wave turbines succeed while conventional wave turbines fail. The conventional wave turbines have been not commercialized for more 25 years, because they have too many conversions and moving parts to sustain severe waves of rivers or oceans.

The conventional tidal turbines or wind turbines have 6 power conversions (1) an electrical rotor to an electrical stator (2) the electrical rotor shaft to the electrical rotor (3) a gear box output shaft to the electrical rotor shaft (4) a link shaft to the gear box output shaft (5) a turbine rotor hub to the link shaft (6) blades to the turbine rotor hub.

The twin tidal turbines or wind turbines have only 3 conversions (1) an electrical rotor/to an electrical stator (2) a gear train output shaft to the electrical rotor shaft (3) turbine rotor to the gear train input shaft, it is clear that which one is the winner.

(G) Drive Train Innovation (1) Modulation

The conventional tidal turbines or wind turbines has a "one to one" type of drive train and has no flexibility, the gearbox ratio is fixed, so a pitch control system must be added in order to optimize the system performance.

The twin tidal turbine 110b has a "one to many" type of drive train, one rotor to multiple satellite generators. It has great flexibility, first each pair of generators 107 has different gear ratio, second each gear train 111 has a solenoid coupler 114, the solenoid coupler has three states. The solenoid coupler has a coil and a plunger, the plunger has a conical hole engaged with a magnetic tip of the alternator shaft, the coil can be: (1) Deactivate—When deactivate, the plunge would engaged with the magnetic shaft, so the generator would generate power (2) Active with a front north polarity—If active with front north polarity, the alternator shaft has the same polarity, they would be disengaged, so at low wind or stream speed, all or some generators can be disengaged, so the rotor can build up speed, as rotor speed up (3) the coil can be switched to south polarity, the alternator shaft has double strong engagement force with the plunger, so with different gear ratios, the drive train acts like a resultant car transmission to optimize the output performances and eliminate the pitch control and the brake system, finally the gear safety pin is the first safety barrier and the joint engagement between solenoid plunger and the alternator is the second safety barrier.

(2) Reliability

The gearbox is the weakest link in the conventional drive train, the biggest problem for the modern tidal turbines or wind turbines drive trains, and it accounts for 60% of failure rates. The gear box is designed between a blade rotor and a generator and has a foundational flaw especially for larger size turbines. The blade rotor has the largest rotational inertial, the generator rotor has the second largest rotational inertial, and the gear box has the smallest output rotational inertial. When the rotor change the speed due to the wind or river stream speed change, the gear box output shaft cannot change immediately, because the generator rotor with the second largest rotational inertial is still rotating at the previous speed according to the Newton's first law, so this condition generates a dynamic speed difference or ratio between a low speed shaft and a high speed shaft in the gear box. Although the gear box has a static gear ratio by a design, the static ratio would not match the dynamic speed ratio, as a result, the gear box becomes a cushion between the static ratio and dynamic speed ratio, this is why the gear box has the highest failure rate, and a flywheel function of the rotor would not produce the power to the generator, but rather damages the gearbox, while the twin rotor has the smart drive train, it has the largest, rotational inertial in the rotor, and two similar, much less rotational inertial in the gear train and the alternator, so the rotor can act like a flywheel to store energy and smoothen rotation, while the gear trains and alternators act accordingly, the smart drive train is the most reliable over all drive trains in the world.

(H) Safety issue

All safety issues are addressed with solutions, the drive train is provided with four safety barrier, each one is designed accordingly with cost vs. protective value by an order, from lowest to highest with a goal to minimize loss and save life and assets. It includes (1) the gear pin (2) the engagement between solenoid plunger and alternator shaft (3) joint between the root ring and the blades (4) pins on the rotor joint all four safety barriers resolve the drive train under abnormal conditions, while the risk of electrical fires are minimized by two sealing solution and cooling systems, T seal ring and sealable bearings are designed to provide robust seals to prevent shaft dynamical leaks, while water cooling coils along with alternators fan are provided with the best natural cooling solution, finally the noise and turbulent wake are greatly reduced by twin rotors and bladed turbine wheels (5) noise, the vertical wind turbine generates vertical up and down wind streams, so localized that it would not populate the vibration like horizontal wave and vibration, because the wave and tidal turbine subsystems have multiple twin rotor assembly turbines around toroid pipe structures, the turbulent and fluid stream become smooth and quiet to hunt wild life (6) safe wind turbines blade, the bladed turbine wheel has the most safest blade design in the history of the wind turbine, wave turbine or tidal turbine, each blade share full load regardless of rotary position of the blades, there is no single blade would be broken, even if wind pass the design limit, the safety pins would be broken but not the bladed turbine wheel, or the turbines.

(I) Scalability

The modular design lays a foundation for scalability of all turbine parts and productions, all rotor and bladed ring sizes, nacelles and drive trains are based on the existing ASME and API pipe schedule, so they have much low cost and high availability with existing supply chains and facilities.

(J) Usability (1) Sustainability. The twin rotor wave turbine has two key sustainable features: the single conversion and the hinge joint, those features can make the turbine sustainable for severe river or ocean conditions, while the twin rotor tidal turbine and the joint between the tidal base system and tidal turbine can sustain tidal direction change impact, the tidal base system is provided with a large, stable base support with the buoyant ring and craws secured with seabed or riverbed, so there is no single tidal turbine base can compare with this turbine system, finally the vertical turbine can sustain strong wind with the safe device, so the radical rotor assembly would stop and return back once the storm passes (2) Sealabilty. The sealabilty is provided with T seal ring assembly and the sealable ball bearings, the sealable ball bearings not only resolve dynamic leakage on the rotors but also increase efficiency and sustain axial and radial loading, while T seal ring solve the leak between two rotors with a pressure energized seal as well spring backed seal to compensate the wear, the design life is between 10 to 20 years (3) Accessibility The system offers the lowest cost for accessibility over existing methods or practices, the wave turbine system is provided with a surface accessibility to check the control box and each turbine performances and a signal of the turbine system for any bypass boat or ship, while each tidal turbines has an airbag lift for on-surface repair or replacement and the tidal turbine base assembly has a decommission airbag lift.

(K) Synergy

This offshore turbine system offers a great synergy ever we never see before, first the conventional offshore wind turbine system has very expensive sub-construction and foundation, this wave turbine subsystem replaces the sub-construction without additional cost but produce more power, while the tidal turbine subsystem replaces the foundation without additional cost but produce more power, the third subsystems share the cables, control system, the tower, the mooring assembly, electrical converter, moreover, the each subsystem can work separately and be modulated and scalable with the turbine farms, so the cost for the system would be greatly reduce, finally with the wave and tidal subsystems, the center of buoyancy and center of gravity of the system for the system greatly lower below sea level, as a result it not only eliminate the substructure cost but also increase stability and power output and reduce further disturbance to the system, while the conventional passive substructures collide with seawater and cause further disturbance to the system.

(L) Affordability

Affordability for any product is based on five factors (1) economy of scale (2) scalability (3) Modularity (4) material availability (5) simple process. With the amazing technologies, the affordability for the reliable and renew energy become the reality in terms of economies of scale with cables, towers, generators, inverters, multiple wave turbines and tidal turbine and wind turbine based on five modulated design based models unlike current turbines in the market, it not only greatly reduce design time, increase scalability for 2 MW to 8000 MW for the turbine farm capability, moreover the production process and inventory greatly reduce too, finally the materials are largely pipe and tubing, there are no expensive materials or structures, which are tubing and pipe bases, there are proven processes like piping structures, twin rotor and blade, the sizes of blade become much smaller, the turbine become much efficient, with multiple modulated turbine and generators 2023, for the smaller vertical wind turbines which can be put on each price-poster in each gas stations or water tower near your town or every street near your city to offshore turbine farms, so your state grid or town take the power to your home with a low LCOE<$0.10 kWh, so this technology would accelerate the 21 first century renewable energy revolution and improve our life like 18 century industrial revolution, tomorrow would be better, we are the human who never stop to dream.

I claim:

1. A turbine farm comprising multiple turbine systems, each of said multiple turbine systems comprises at least one of a plurality of subsystems including a vertical turbine subsystem, a horizontal turbine subsystem, a wave turbine subsystem and a tidal turbine subsystem, said subsystem has at least one turbine, the at least one turbine has a body assembly and a twin rotor assembly, said body assembly has a left body assembly having two ball bearings and a right body assembly having two ball bearings, said twin rotor assembly has a left rotor assembly movably engaged with said left body assembly by means of said two ball bearings and a right rotor assembly movably engaged with said right body assembly by means of said two ball bearings, each of said two ball bearings has a left ring and a right ring and multiple balls disposed between said left ring and said right ring, a left wedge insert ring and a right wedge insert ring respectively disposed between said left ring and said right ring, said left ring has a left conical surface and a left ball groove, said right ring has a right conical surface and a right ball groove, said multiple balls are respectively engaged with said left ball groove and said right ball groove, said left insert ring and said right insert ring are respectively disposed between said left conical surface and said right conical surface, said left ring and said right ring have one of a plurality of materials including magnetic materials and nonmagnetic materials, the at least two ball bearings has fluids for providing seals and multiple seal rings respectively on said left ring and said right ring for external seals, the at least one turbine has at least one of a plurality of electrical machines including (1) a machine having an electrical stator and an electrical rotor (2) a rack installed with said body assembly and a geared ring installed with said twin rotor assembly, and at least one satellite machine having a gear train and an alternator and a coupling assembly connecting between said gear train and said alternator, said alternator has a magnetic shaft having a conical tip, an alternator gear and a fan, said gear train has an input gear having an input shaft engaged with said gear ring for transferring rotations between said twin rotor assembly and said alternator, a safety pin coupling between said input gear and said input shaft for protecting said alternator, said coupling assembly has an output gear of said gear train engaged with said alternator gear, said alternator gear has a solenoid coupler including a solenoid coil and a plunger having a conical bore to receive said conical tip of said magnetic shaft, a dowel pin movably disposed in a slot between said alternator gear and said plunger for securing radial engagements and axial freedoms, the at least one turbine has at least one of a plurality of power supplies including (a) wind power (b) raining power (c) wave power (d) tidal power (e) river stream power (f) any natural fluid stream (g) electricity (h) engine drivers (i) burners (i) hot gas (j) driver train.

2. The turbine farm of claim 1, wherein each of said multiple turbine systems comprises (a) said vertical turbine subsystem, and at least one vertical turbine subsystem has said body assembly having said left rotor assembly engaged with said let rotor assembly and said left rotor assembly engaged with said let rotor assembly to form at least one radial access and at least one axial access, said body assembly has a support adapter bore, said left body assembly having a pair of position flanges and a pair of springs on each side of said left rotor assembly, said tight body assembly has a pair of position flanges and a pair of springs on each side of said right rotor assembly, said left rotor assembly has a left axial rotor assembly and a left radial rotor assembly, a left rotor housing constructed between said left axial rotor assembly and said left radial rotor assembly, said left radial rotor assembly has a left skirt ring having a high power zone and a low power zone defined by an inside diameter of said left skirt ring for harnessing of external power sources, said left skirt ring has at least one bladed turbine wheel having radial blade assemblies, each of said radial blade assemblies has a blade bore and a blade cover and a safety device having at least one hinge connecting between said blade cover and said blade bore, one of a plurality of joint methods including gluing, spot welding, safer pins and springs for protecting preset limits between said blade cover and said blade bore, said radial blade has an external curvature surface for minimizing fluid resistance and an internal curvature surface for maximizing fluid power, said left axial blade rotor assembly has a cover having at least one set of blades including one of a plurality of structures having internal blades and external blades, said cover has a high power zone and a low power zone, said right rotor assembly has a right axial rotor assembly and a right radial rotor assembly, a right rotor housing constructed between said right axial rotor assembly and said right radial rotor assembly, said right radial rotor assembly has a right skirt ring having a high power zone and a low power zone defined by an inside diameter of said right skirt ring for harnessing of external power sources, said right skirt ring has at least one bladed turbine wheel having radial blade assemblies, each of said radial blade assemblies has a blade bore and a blade cover and a safety device having at least one hinge connecting between said blade cover and said blade bore, one of a plurality of joint methods including gluing, spot welding, safer pins and springs for protecting preset limits between said blade cover and said blade bore, said radial blade has an external curvature surface for minimizing fluid resistance and an internal curvature surface for maximizing fluid power, said right axial blade rotor assembly has a cover having at least one set of blades including one of a plurality of structures having internal blades and external blades, said cover has a high power zone and a low power zone (b) said wave turbine subsystem having a mooring assembly, said mooring assembly has a tower union, mooring lines inducing chains and ropes to extend to waterbed through said tidal turbine subsystem and a buoy assembly, said buoy assembly has hinge holders, each of said hinge holders has at least one joint pin holes and a wire hole extending to said tower union assembly, the at least one turbine has at least one joint pin inserted into the at the least one joint pin hole for securing rotation of the at least one turbine around the at least one joint pin, said buoy assembly has one of a plurality of structures including torpid pipes, polygonal pipes, a single straight pipe and multiple pipes, the at least one turbine has said left rotor assembly and said right rotor assembly, the at least one turbine has a T seal ring assembly disposed between said left rotor assembly and said right rotor assembly for seals, said T seal ring assembly has two axially conical surfaces, two radially conical surfaces and two lock ring grooves, two lock rings respectively disposed in said grooves to generate preloading and to compensate wears, said left rotor assembly has an end having a mated surface engaged with a first of said two axially conical surfaces, said right rotor assembly has an end having a mated surface engaged with a second of said two axially conical surfaces, said body assembly has at least one fluids heat exchanger with two end openings for cooling said electrical machines, said left rotor assembly has a nozzle defined by one of a plurality of shapes including cylinder, conical and spherical, a bladed turbine wheel and a tubing assembly having multiple sets of internal blades, said left tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades said bladed turbine wheel has two radial zones said left rotor assembly has a safety device having at least two safety pins coupling between said bladed turbine wheel and said tubing assembly for protecting a preset shear limit, said right rotor assembly has a nozzle defined by one of a plurality of shapes including cylinder, conical and spherical, a bladed turbine wheel and a tubing assembly having multiple sets of internal blades, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly has a safety device having at least two safety pins coupling between said bladed turbine wheel and said tubing assembly for protecting preset shear limits (c) said tidal turbine subsystem and a lift tower assembly, said lift tower assembly has a buoy ring assembly defined by one of a plurality of shapes including toroid pipes, polygonal pipes, a single straight pipe and multiple pipes, a lift air bag attached to said buoy ring assembly, said buoy ring assembly has a lift tower adaptor to connect to said tower union with a piston joint for releasing joint stress under loads, a base joint having multiple claws to receive said mooring lines/chains for anchoring a position between surfaces to said waterbed, said buoy ring assembly has a depth adjustable device having a contained fluid and at least two control valves configured to be filled and drained with said contained fluid to balance with the weights of the tidal turbine subsystem against a depth of deployment, said lift tower assembly further comprises at least one turbine adaptor assembly to receive the at least one turbine rotatably, the at least one turbine adaptor assembly has a turbine buoy and a lift airbag, the at least one turbine has said left rotor assembly and said right rotor assembly, the at least one turbine has a T seal ring assembly disposed between said left rotor assembly and said right rotor assembly for seals, said T seal ring assembly has two axially conical surfaces, two radially conical surfaces and two lock ring grooves, two lock rings respectively disposed in said grooves to generate preloading and to compensate wears, said left rotor assembly has an end having a mated surface engaged with a first of said two axially conical surfaces, said right rotor assembly has an end having a mated surface engaged with a second of said two axially conical surfaces, said body assembly has at least one fluids heat exchanger with two end openings for cooling said electrical machines, said left rotor assembly has a nozzle defined by one of a plurality of shapes including cylinder, conical and spherical, a bladed turbine wheel and a tubing assembly having multiple sets of internal blades, said left tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly has a safety device having at least two safety pins coupling between said bladed turbine wheel and said tubing assembly for protecting preset shear limits, said right rotor assembly has a nozzle defined by one of a plurality of shapes including cylinder, conical and spherical, a bladed turbine wheel and a tubing assembly having multiple sets of internal blades, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly has a safety device having at least two safety pins coupling between said bladed turbine wheel and said tubing assembly for protecting preset shear limits.

3. The turbine farm of claim 1, wherein each of said multiple turbine systems comprises (a) said horizontal turbine subsystem comprising a support, and at least one horizontal turbine subsystem has a support adapter to connect to said support and fins and said left body assembly having multiple covers and multiple ventilation holes under said covers for harnessing external power sources, and said right body assembly having multiple covers and multiple ventilation holes under said covers for harnessing external power sources, said left rotor assembly has a nozzle, a bladed turbine wheel and a tubing assembly having at least one external bladed turbine wheel to take said external power sources, said tubing assembly connecting to said nozzle and said bladed turbine wheel has multiple sets of internal blades and multiple radical through holes, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly have a safety device having at least two safety pins coupling between said bladed turbine wheel and said tubing assembly for protecting a preset shear limit, said right rotor assembly has a nozzle, a bladed turbine wheel and a tubing assembly having at least one external bladed turbine wheel to take said external power sources, said tubing assembly connecting to said nozzle and said bladed turbine wheel has multiple sets of internal blades and multiple radical through holes, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly have a safety device having at least two safety pins coupling between said bladed turbine wheel and said tubing assembly for protecting a preset shear limit zone (b) said wave turbine subsystem having a mooring assembly, said mooring assembly has a tower union, mooring lines inducing chains and ropes to extend to a waterbed through said tidal turbine subsystem and a buoy assembly, said buoy assembly has hinge holders, each of said hinge holders has at least one joint pin holes and a wire hole extending to said tower union assembly, the at least one turbine has at least one joint pin inserted into the at the least one joint pin hole for securing rotation of the at least one turbine around the at least one joint pin, said buoy assembly has one of a plurality of structures including toxoid pipes, polygonal pipes, a single straight pipe and multiple pipes, the at least one turbine has said left rotor assembly and said right rotor assembly, the at least one turbine has a T seal ring assembly disposed between said left rotor assembly and said right rotor assembly for seals, said T seal ring assembly has two axially conical surfaces, two radially conical surfaces and two lock ring grooves, two lock rings respectively disposed in said grooves to generate preloading and to compensate wears, said left rotor assembly has an end having a mated surface engaged with a first of said two axially conical surfaces, said right rotor assembly has an end having a mated surface engaged with a second of said two axially conical surfaces, said body assembly has at least one fluids heat exchanger with two end openings for cooling said electrical machines, said left rotor assembly has a nozzle defined by one of a plurality of shapes including cylinder, conical and spherical, a bladed turbine wheel and a tubing assembly having multiple sets of internal blades, said left tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly has a safety device having at least two safety pins coupling between said bladed turbine wheel and said tubing assembly for protecting a preset shear limit, said right rotor assembly has a nozzle defined by one of a plurality of shapes including cylinder, conical and spherical, a bladed turbine wheel and a tubing assembly having multiple sets of internal blades, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly has a safety device having at least two safety pins coupling between said bladed turbine wheel and said tubing assembly for protecting preset shear limits (c) said tidal turbine subsystem and a lift tower assembly, said lift tower assembly has a buoy ring assembly defined by one of a plurality of shapes including toroid pipes, polygonal pipes, a single straight pipe and multiple pipes, a lift air bag attached to said buoy ring assembly, said buoy ring assembly has a lift tower adaptor to connect to said tower union with a piston joint for releasing joint stress under loads, a base joint having multiple claws to receive said mooring lines/chains for anchoring a position between surfaces to said waterbed, said buoy ring assembly has a depth adjustable device having a contained fluid and at least two control valves configured to be filled and drained with said contained fluid to balance with the weights of tidal turbine subsystem against a depth of deployment, said lift tower assembly further comprises at least one turbine adaptor assembly to receive the at least one turbine rotatably, the at least one turbine adaptor assembly has a turbine buoy and a lift airbag, the at least one turbine has said left rotor assembly and said right rotor assembly, the at least one turbine has a T seal ring assembly disposed between said left rotor assembly and said right rotor assembly for seals, said T seal ring assembly has two axially conical surfaces, two radially conical surfaces and two lock ring grooves, two lock rings respectively disposed in said grooves to generate preloading and to compensate wears, said left rotor assembly has an end having a mated surface engaged with a first of said two axially conical surfaces, said right rotor assembly has an end having a mated surface engaged with a second of said two axially conical surfaces, said body assembly has at least one fluids heat exchanger with two end openings for cooling said electrical machines, said left rotor assembly has a nozzle defined by one of a plurality of shapes including cylinder, conical and spherical, a bladed turbine wheel and a tubing assembly having multiple sets of internal blades, said left tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly has a safety device having at least two safety pins coupling between said bladed turbine wheel and said tubing assembly for protecting preset shear limits, said right rotor assembly has a nozzle defined by one of plurality of shapes including cylinder, conical and spherical, a bladed turbine wheel and a tubing assembly having multiple set of internal blades, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly has a safety device having at least two safety pins coupling between said bladed turbine wheel and said tubing assembly for protecting said preset shear limits.

4. The turbine farm of claim 1, wherein at least one of said multiple turbine systems comprises (a) said vertical turbine subsystem, and at least one vertical turbine subsystem has said body assembly having said left rotor assembly engaged with said left rotor assembly and said left rotor assembly engaged with said left rotor assembly to form at least one radial access and at least one axial access, said body assembly has a support adapter bore, said left body assembly having a pair of position flanges and a pair of springs on each side of said left rotor assembly, said right body assembly has a pair of position flanges and a pair of springs on each side of said right rotor assembly, said left rotor assembly has a left axial rotor assembly and a left radial rotor assembly, a left rotor housing constructed between said left axial rotor assembly and said left radial rotor assembly, said left radial rotor assembly has a left skirt ring having a high power zone and a low power zone defined by an inside diameter of said left skirt ring for harnessing of external power sources, said left skirt ring has at least one bladed turbine wheel having radial blade assemblies, each of said radial blade assemblies has a blade bore and a blade cover and a safety device having at least one hinge connecting between said blade cover and said blade bore, one of a plurality of joint methods including gluing, spot welding, safer pins and springs for preset loading limits between said blade cover and said blade bore, said radial blade has an external curvature surface for minimizing fluid resistance and an internal curvature surface for maximizing a fluid power source, said left axial blade rotor assembly has a cover having at least one set of blades including one of a plurality of structures having internal blades and external blades, said cover has a high power zone and a low power zone, said right rotor assembly has a right axial rotor assembly and a right radial rotor assembly, a right rotor housing constructed between said right axial rotor assembly and said right radial rotor assembly, said right radial rotor assembly has a right skirt ring having a high power zone and a low power zone and the at least one bladed turbine wheel for harnessing of said external power sources, said right skirt ring has the at least one bladed turbine wheel having said radial blade assemblies, said right axial blade rotor assembly has a cover having at least one set of blades including a plurality of structures having internal blades and external blades, said cover has a high power zone and a low power zone (b) said wave turbine subsystem having a mooring assembly, said mooring assembly has a tower union, mooring lines inducing chains and ropes to extend to a waterbed through said tidal turbine subsystem and a buoy assembly, said buoy assembly has hinge holders, each of said hinge holders has at least one joint pin holes and a wire hole extending to said tower union assembly, the at least one turbine has at least one joint pin inserted into the at the least one joint pin hole for securing rotation of the at least one turbine around the at least one joint pin, said buoy assembly has one of a plurality of structures including torpid pipes, polygonal pipes, a single straight pipe and multiple pipes, the at least one turbine has said left rotor assembly and said right rotor assembly, the at least one turbine has a T seal ring assembly disposed between said left rotor assembly and said right rotor assembly for seals, said T seal ring assembly has two axially conical surfaces, two radially conical surfaces and two lock ring grooves, two lock rings respectively disposed in said grooves to generate preloading and to compensate wears, said left rotor assembly has an end having a mated surface engaged with a first of said two axially conical surfaces, said right rotor assembly has an end having a mated surface engaged with a second of said two axially conical surfaces, said body assembly has at least one fluids heat exchanger with two end openings for cooling said electrical machines, said left rotor assembly has a nozzle defined by one of a plurality of shapes including cylinder, conical and spherical, a bladed turbine wheel and a tubing assembly having multiple sets of internal blades, said left tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly has a safety device having at least two safety pins coupling between said bladed turbine wheel and said tubing assembly for protecting a preset shear limit, said right rotor assembly has a nozzle defined by one of a plurality of shapes including cylinder, conical and spherical, a bladed turbine wheel and a tubing assembly having multiple sets of internal blades, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly has a safety device having at least two safety pins coupling between said bladed turbine wheel and said tubing assembly for protecting said preset shear limits.

5. The turbine farm of claim 1, wherein at least one of said multiple turbine systems comprises (a) said horizontal turbine subsystem comprising a support, and at least one horizontal turbine subsystem has a support adapter to connect to said support and fins and said left body assembly having multiple covers and multiple ventilation holes under said covers for harnessing external power sources, and said right body assembly having multiple covers and multiple ventilation holes under said covers for harnessing said external power sources, said left rotor assembly has a nozzle, a bladed turbine wheel and a tubing assembly having at least one external bladed turbine wheel to take said external power sources, said tubing assembly connecting to said nozzle and said bladed turbine wheel has multiple sets of internal blades and multiple radial through holes, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly have a safety device having at least two safety pins coupling between said bladed turbine wheel and said tubing assembly for protecting a preset shear limit, said right rotor assembly has a nozzle, a bladed turbine wheel and a tubing assembly having at least one external bladed turbine wheel to take said external power sources, said tubing assembly connecting to said nozzle and said bladed turbine wheel has multiple sets of internal blades and multiple radial through holes, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly have a safety device having at least two safety pins coupling between said bladed turbine wheel and said tubing assembly for protecting the preset shear limit zone (b) said wave turbine subsystem having a mooring assembly, said mooring assembly has a tower union, mooring lines inducing chains and ropes to extend to a waterbed through said tidal turbine subsystem and a buoy assembly, said buoy assembly has hinge holders, each of said hinge holders has at least one joint pin holes and a wire hole extending to said tower union assembly, the at least one horizontal turbine subsystem has at least one joint pin inserted into the at least one joint pin hole for securing rotation of the at least one horizontal turbine subsystem around the at least one joint pin, said buoy assembly has one of a plurality of structures including torpid pipes, polygonal pipes, a single straight pipe and multiple pipes, the at least one horizontal turbine subsystem has said left rotor assembly and said right rotor assembly, the at least one turbine has a T seal ring assembly disposed between said left rotor assembly and said right rotor assembly for seals, said T seal ring assembly has two axially conical surfaces, two radially conical surfaces and two lock ring grooves, two lock rings respectively disposed in said grooves to generate preloading and to compensate wears, said left rotor assembly has an end having a mated surface engaged with a first of said two axially conical surfaces, said right rotor assembly has an end having a mated surface engaged with a second of said two axially conical surfaces, said body assembly has at least one fluids heat exchanger with two end openings for cooling said electrical machines, said left rotor assembly has a nozzle defined by one of a plurality of shapes including cylinder, conical and spherical, a bladed turbine wheel and a tubing assembly having multiple sets of internal blades, said left tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly has a safety device having at least two safety pins coupling between said bladed turbine wheel and said tubing assembly for protecting a preset shear limit, said right rotor assembly has a nozzle defined by one of a plurality of shapes including cylinder, conical and spherical, a bladed turbine wheel and a tubing assembly having multiple sets of internal blades, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly has a safety device having at least two safety pins coupling between said bladed turbine wheel and said tubing assembly for protecting said preset shear limits.

6. The turbine farm of claim 1, wherein at least one of said multiple turbine systems comprises (a) said wave turbine subsystem having a mooring assembly, said mooring assembly has a tower union, mooring lines inducing chains and ropes to extend to a waterbed through said tidal turbine subsystem and a buoy assembly, said buoy assembly has hinge holders, each of said hinge holders has at least one joint pin holes and a wire hole extending to said tower union assembly, the wave turbine subsystem has at least one joint pin inserted into the at the least one joint pin hole for securing rotation of the wave turbine subsystem around the at least one joint pin, said buoy assembly has one of a plurality of structures including toroid pipes, polygonal pipes, a single straight pipe and multiple pipes, the wave turbine subsystem has said left rotor assembly and said right rotor assembly, the wave turbine subsystem has a T seal ring assembly disposed between said left rotor assembly and said right rotor assembly for seals, said T seal ring assembly has two axially conical surfaces, two radially conical surfaces and two lock ring grooves, two lock rings respectively disposed in said grooves to generate preloading and to compensate wears, said left rotor assembly has an end having a mated surface engaged with a first of said two axially conical surfaces, said right rotor assembly has an end having a mated surface engaged with a second of said two axially conical surfaces, said body assembly has at least one fluids heat exchanger with two end openings for cooling said electrical machines, said left rotor assembly has a nozzle defined by one of a plurality of shapes including cylinder, conical and spherical, a bladed turbine wheel and a tubing assembly having multiple sets of internal blades, said left tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly has a safety device having at least two safety pins coupling between said bladed turbine wheel and said tubing assembly for protecting said preset shear limit, said right rotor assembly has a nozzle defined by one of a plurality of shapes including cylinder, conical and spherical, a bladed turbine wheel and a tubing assembly having multiple sets of internal blades, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly has a safety device having at least two safety pins coupling between said bladed turbine wheel and said tubing assembly for protecting said preset shear limits (b) said tidal turbine subsystem and a lift tower assembly, said lift tower assembly has a buoy ring assembly defined by one of a plurality of shapes including torpid pipes, polygonal pipes, a single straight pipe and multiple pipes, a lift air bag attached to said buoy ring assembly, said buoy ring assembly has a lift tower adaptor to connect to said tower union with a piston joint for releasing joint stress under loads, a base joint having multiple claws to receive said mooring lines/chains for anchoring a position between surfaces to said waterbed, said buoy ring assembly has a depth adjustable device having a contained fluid and at least two control valves configured to be filled and drained with said contained fluid to balance with the weights of the tidal turbine subsystem against a depth of deployment, said lift tower assembly further comprises at least one turbine adaptor assembly to receive the at least one tidal turbine subsystem rotatably, the at least one turbine adaptor assembly has a turbine buoy and a lift airbag, the at least one turbine has said left rotor assembly and said right rotor assembly, the at least one tidal turbine subsystem has a T seal ring assembly disposed between said left rotor assembly and said right rotor assembly for seals, said T seal ring assembly has two axially conical surfaces, two radially conical surfaces and two lock ring grooves, two lock rings respectively disposed in said grooves to generate preloading and to compensate wears, said left rotor assembly has an end having a mated surface engaged with a first of said two axially conical surfaces, said right rotor assembly has an end having a mated surface engaged with a second of said two axially conical surfaces, said body assembly has at least one fluids heat exchanger with two end openings for cooling said electrical machines, said left rotor assembly has a nozzle defined by one of a plurality of shapes including cylinder, conical and spherical, a bladed turbine wheel and a tubing assembly having multiple sets of internal blades, said left tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly has a safety device having at least two safety pins coupling between said bladed turbine wheel and said tubing assembly for protecting said preset shear limits, said right rotor assembly has a nozzle defined by one of a plurality of shapes including cylinder, conical and spherical, a bladed turbine wheel and a tubing assembly having multiple sets of internal blades, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly has a safety device having at least two safety pins coupling between said bladed turbine wheel and said tubing assembly for protecting said preset shear limits.

7. The turbine farm of claim 1, wherein each of said multiple turbine systems comprises said vertical turbine subsystem, and at least one vertical turbine subsystem has said body assembly having said left rotor assembly engaged with said left rotor assembly and said left rotor assembly engaged with said left rotor assembly to form at least one radial access and at least one axial access, said body assembly has a support adapter bore, said left body assembly having a pair of position flanges and a pair of springs one each side of said left rotor assembly, said right body assembly has a pair of position flanges and a pair of springs one each side of said right rotor assembly, said left rotor assembly has a left axial rotor assembly and a left radial rotor assembly, a left rotor housing constructed between said left axial rotor assembly and said left radial rotor assembly, said left radial rotor assembly has a left skirt ring having a high power zone and a low power zone defined by an inside diameter of said left skirt ring for harnessing of external power sources, said left skirt ring has at least one bladed turbine wheel having radial blade assemblies, each of said radial blade assemblies has a blade bore and a blade cover and a safety device having at least one hinge connecting between said blade cover and said blade bore, one of a plurality of joint methods including gluing, spot welding, safer pins and springs for protecting a preset shear limit between said blade cover and said blade bore, said radial blade has an external curvature surface for minimizing a fluid resistance and an internal curvature surface for maximizing a fluid power source, said left axial blade rotor assembly has a cover having at least one set of blades including one of a plurality of structures having internal blades and external blades, said cover has a high power zone and a low power zone, said right rotor assembly has a right axial rotor assembly and a right radial rotor assembly, a right rotor housing constructed between said right axial rotor assembly and said right radial rotor assembly, said right radial rotor assembly has a right skirt ring having a high power zone and a low power zone defined by an inside diameter of said right skirt ring for harnessing of said external power sources, said right skirt ring has at least one bladed turbine wheel having radial blade assemblies, each of said radial blade assemblies has a blade bore and a blade cover and a safety device having at least one hinge connecting between said blade cover and said blade bore, one of a plurality of joint methods including gluing, spot welding, safer pins and springs for protecting the preset shear limit between said blade cover and said blade bore, said radial blade has an external curvature surface for minimizing a fluid resistance and an internal curvature surface for maximizing a fluid power souce, said right axial blade rotor assembly has a cover having at least one set of blades including one of a plurality of structures having internal blades and external blades said cover has a high power zone and a low power zone.

8. The turbine farm of claim 1, wherein each of said multiple turbine systems comprises said horizontal turbine subsystem comprising a support, and at least one horizontal turbine subsystem has a support adapter to connect to said support and fins and said left body assembly having multiple covers and multiple ventilation holes under said covers for harnessing external power sources, and said right body assembly having multiple covers and multiple ventilation holes under said covers for harnessing said external power sources, said left rotor assembly has a nozzle, a bladed turbine wheel and a tubing assembly having at least one external bladed turbine wheel to take said external power sources, said tubing assembly connecting to said nozzle and said bladed turbine wheel has multiple sets of internal blades and multiple radial through holes, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said left rotor assembly have a safety device having at least two safety pins coupling between said bladed turbine wheel and said tubing assembly for protecting a preset shear limit, said right rotor assembly has a nozzle, a bladed turbine wheel and a tubing assembly having at least one external bladed turbine wheel to take said external power sources, said tubing assembly connecting to said nozzle and said bladed turbine wheel has multiple sets of internal blades and multiple radial through holes, said tubing assembly has a high power zone and a low power zone defined by inside diameters of said multiple sets of internal blades, said bladed turbine wheel has an edge ring and a root ring, at least two long blades between said edge ring and said root ring, said edge ring has at least two short blades, said bladed turbine wheel has two radial zones, said right rotor assembly have a safety device having at least two safety pins coupling between said bladed turbine wheel and said tubing assembly for protecting the preset shear limit.

* * * * *